US009100588B1

(12) United States Patent
Seymour

(10) Patent No.: US 9,100,588 B1
(45) Date of Patent: Aug. 4, 2015

(54) COMPOSITE IMAGE FORMATTING FOR REAL-TIME IMAGE PROCESSING

(71) Applicant: Bruce A. Seymour, St. Louis, MO (US)

(72) Inventor: Bruce A. Seymour, St. Louis, MO (US)

( * ) Notice: Subject to any disclaimer, the term of this patent is extended or adjusted under 35 U.S.C. 154(b) by 107 days.

(21) Appl. No.: 13/780,823

(22) Filed: Feb. 28, 2013

Related U.S. Application Data

(60) Provisional application No. 61/604,016, filed on Feb. 28, 2012.

(51) Int. Cl.
*H04N 5/225* (2006.01)
*H04N 5/262* (2006.01)

(52) U.S. Cl.
CPC .................................. *H04N 5/2621* (2013.01)

(58) Field of Classification Search
None
See application file for complete search history.

(56) References Cited

U.S. PATENT DOCUMENTS

| | | | | |
|---|---|---|---|---|
| 5,845,166 A | * | 12/1998 | Fellegara et al. | 396/429 |
| 6,148,148 A | | 11/2000 | Wain | |
| 6,198,526 B1 | * | 3/2001 | Ohtsuka | 355/40 |
| 6,507,361 B1 | | 1/2003 | Barber | |
| 6,654,506 B1 | * | 11/2003 | Luo et al. | 382/282 |
| 7,077,581 B2 | | 7/2006 | Gluck | |
| 7,130,474 B2 | | 10/2006 | Luo | |
| 7,170,633 B2 | | 1/2007 | Hara | |
| 7,171,058 B2 | | 1/2007 | Luo | |
| 7,551,211 B2 | * | 6/2009 | Taguchi et al. | 348/239 |
| 7,712,045 B2 | | 5/2010 | LeMay | |
| 7,768,669 B2 | | 8/2010 | Sakamoto | |
| 7,885,522 B2 | | 2/2011 | Gassman | |
| 7,885,538 B2 | | 2/2011 | Ueda | |
| 2001/0028474 A1 | * | 10/2001 | Parulski et al. | 358/1.16 |
| 2003/0001846 A1 | | 1/2003 | Davis | |
| 2003/0086133 A1 | * | 5/2003 | Schinner | 358/538 |
| 2003/0138236 A1 | * | 7/2003 | Um et al. | 386/69 |
| 2004/0076342 A1 | * | 4/2004 | Wolff et al. | 382/294 |
| 2005/0286888 A1 | * | 12/2005 | Konttinen | 396/374 |
| 2006/0197963 A1 | * | 9/2006 | Royal et al. | 358/1.2 |
| 2006/0221198 A1 | * | 10/2006 | Fry et al. | 348/222.1 |
| 2008/0252788 A1 | * | 10/2008 | Dadourian | 348/586 |
| 2009/0042654 A1 | | 2/2009 | Barber | |
| 2012/0011540 A1 | * | 1/2012 | Pulford | 725/32 |
| 2012/0102398 A1 | * | 4/2012 | Cok | 715/274 |
| 2012/0141023 A1 | * | 6/2012 | Wang et al. | 382/162 |

FOREIGN PATENT DOCUMENTS

JP 10-257427 A 9/1998
WO 97/50243 A1 12/1997

* cited by examiner

*Primary Examiner* — Twyler Haskins
*Assistant Examiner* — Wesley J Chiu
(74) *Attorney, Agent, or Firm* — CreatiVenture Law, LLC; Dennise JM Donahue, III

(57) ABSTRACT

A real-time image processing method and system has an output image framing technique which displays a live view image in an effective image area. The effective image area is a predefined portion of an overall composite image that forms the output image which can include at least one other image area, such as a logo, banner or other overlay image, and the effective image area is the maximum size automatically cropped from a source image of a digital camera based on an aspect ratio and orientation of the effective image in the predefined portion of the output image. The system displays the effective image on a view screen in real-time during a photo shoot in the same aspect ratio and orientation as the effective image area that is the predefined portion of the composite image without requiring any post-processing cropping or rotation of the image or camera rotation.

20 Claims, 22 Drawing Sheets

FIG. 10C

Picture Layout Template: 1 ▼ 4x6  Portrait Banner Bottom 4x6   ✏ Variable Banners Printer Available for Preview:

| Manufacturer/Model | Base Printer Device Name | Paper Name | Printer Notes |
|---|---|---|---|
| ▷ Canon | Canon IP4900 series | 4"x6" 10x15cm | Set Printer Properties to Landscape |
| DS-40 | DS40 (Copy) | (6x4) | |
| Hiti | HiTi Photo Printer P510 series | 6x4 / 152x100mm | |
| Mitsubishi | MITSUBISHI 1 | 10x15 (4"x6") | |
| Sony CX 1 | Sony 4 CX 1 | UPC-C14 | |

Portrait Banner:

🖉 Edit Banner    🔍 Preview

Main Image Position: ● Portrait ○ Landscape    Selected Printer: Canon

📷 Browse for Banner

GoogleEye® PHOTOSHARE

FIG. 12

COMPOSITE IMAGE FORMATTING FOR REAL-TIME IMAGE PROCESSING

CROSS-REFERENCE TO RELATED APPLICATIONS

This application is based on provisional patent application Ser. No. 61/604,016 filed on Feb. 28, 2012 which is hereby incorporated by reference in its entirety, particularly including the US applications and patents cited therein.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to image processing systems, and more particularly to image processing systems for real-time imaging systems with image capture and immediate image output.

2. Related Art

With the advent of digital photography, viewfinder systems for tethered cameras have improved but still have many shortcomings. A camera connected to a computer and the view normally seen through the camera viewfinder can be seen in real-time on the computer screen. This technology is previously known and can be found on numerous cameras. However, the current viewfinder technology is inadequate for environments where pictures are taken and immediately selected and printed. In such environments, post-processing of the images, such as recomposing, cropping, rotating, inserting graphics and text, has several drawbacks that current systems are not able to resolve. This post-processing of the images increases the time to produce a print, increases the expertise needed by the photographer and reduces the number of pictures taken and how many can be processed. Accordingly, it would be beneficial to provide a system which minimizes the post-processing requirements.

With previously known systems, the aspect ratio of the live view is determined by the data stream coming from the camera, i.e., the source image. However, this source image aspect ratio is rarely going to be the same aspect ratio as the image that will appear on the print. As a result, it becomes difficult to accurately compose the photograph using currently available optical or digital viewfinder systems. The photographer is forced to guess at what picture elements will be in the photo and which elements will be cut out. For example if a photographer is using a typical modern digital single lens reflex camera the image from the camera has an aspect ratio of 1.5. The aspect ratio of a 5"×7" print is 1.4 or and 8"×10" print is 1.25. Some area of the image must be removed if the photo is to be printed with no borders or borders that have a uniform width. Even if a 4"×6" print is created with the matching 1.5 aspect ratio matching the camera image, often times graphical banners or other elements are on the photo obscuring a portion of the print changing the aspect ratio of the printed area. If the aspect ratio were the same for all steps in the photographic process (live view, previewing for print selection and printing or other outputs), the quality and speed of the operation could be greatly improved. With current systems, the photographer must reevaluate how much of the picture will be cropped out whenever changes are made to a camera's image sizes and aspect ratios.

Additional problems occur when the camera is attached to a tripod and the photographer needs the ability to switch between portrait and landscape orientations. With current systems, the photographer must physically rotate, realign and re-secure the camera on the tripod. This is a disruptive, tedious and time consuming process especially at events where many people must be photographed in a short time. A viewfinder system is needed where a single click of a button, photo orientation is changed and the photographer only needs to make minor adjustments if any in the aiming of the camera.

In most prior art image processing systems for photo booths and photography studios, there is some loss of data from the captured image (the picture) at one or more steps in the process. In some systems, there may be a loss of data at each step from the viewfinder to the captured image to the output picture, whether it is a print or even a digital output, such as thumbnails. Existing photo booths and photography studios commonly crop the initially captured image as the picture is processed through the system. Typically, as the image is processed in the system, a portion of the picture is sacrificed through a cropping process to maintain the aspect ratio that is required by the system or device at the particular step.

The viewfinder usually shows the maximum size of the image, i.e., the source image. This aspect ratio rarely matches subsequent display screens and virtually never matches the output dimensions used for final compositions that may be in print or electronic formats. In photography, taking the picture and the composition of the photograph (relative amounts of space to the left, right, top or bottom of the subject of interest) may have little bearing on the proportions and content of the end product. Cropping an image can change the focal subject matter of the picture which can alter the context of the scene and possibly create a completely new work of art from an existing initial photograph. In other cases, sloppy attention to composition is thought permissible because of the anticipated cropping of the picture during the image processing steps.

The heavy reliance upon cropping separates what the photographer sees through the viewfinder from the end product. When the photographer is a professional with ample time to spend altering the picture between the time it is taken and the delivery of the end product, this may be an acceptable practice even with the inefficiencies and possible loss of resolution. However, in a photo booth and some photography studios, particularly those where pictures are being printed immediately after the image is captured, no professional photographer is necessarily involved, and the cropping of digital images commonly introduces loss of quality because of lossy compression algorithms used in many cameras for JPEG and other formats of image storage.

Many people who are given the opportunity to see the final composition of a picture in the camera's viewfinder are able to naturally compose well-balanced photographs. This includes self-portraits when the photographer and subject are the same person when this person is able to see the viewfinder while they are posing. If unintentional or systemic cropping is introduced between this composition step through the viewfinder (or a display thereof on a computer monitor) and the various processing step to the output image, the picture compositions are sacrificed and potentially significant elements of the picture will be cropped with the possibility of being entirely and permanently deleted from the image data.

Some systems perform post-processing on the pictures to produce a desired aspect ratio. For an original digital image that has already been taken in a pre-defined aspect ratio of a camera, some post-processing methods will format the aspect ratio of the image for the aspect ratio of a particular printer or other output for the picture while other post-processing methods may combine the image with other elements, including logos, banners and other overlays, such as calendars, postcards, photo collages and various photo arrangements. These known systems typically capture images in a particular aspect ratio that is set for the camera, and some camera systems are known to have various aspect ratio settings that can be selected by the photographer.

Examples of known image processing systems are described in the references cited in the accompanying Information Disclosure Statement.

SUMMARY OF THE INVENTION

The present invention is for a real-time image processing method and system in which a printed image framing technique displays an effective image area of a live subject that is being viewed through a digital camera, and the effective image area is defined as a portion of a composite image area according to an overall picture composition. The effective image is formed by automatically cropping the picture that is captured by the camera; the cropping is defined in advance and is performed in real-time as the images are transferred from the camera to the computer. Accordingly, the composite image can be larger than the effective image along and includes at least one other image, such as a logo, banner or other overlay image. The effective image area is displayed on a screen or viewfinder in real-time during a photo shoot and is formatted for placement in the composite image without any need to further crop or otherwise scale the effective image as it is viewed by the photographer who is composing the picture.

In a particular embodiment described in detail below, the effective image is shown relative to the composite image on the view screen or the viewfinder. For simplicity in this patent application, the inventive system and method are respectively referred to as the GoodEye system and the GoodEye method.

Further areas of applicability of the present invention will become apparent from the detailed description provided hereinafter. It should be understood that the detailed description and specific examples, while indicating particular embodiments of the invention, are intended for purposes of illustration only and are not intended to limit the scope of the invention.

BRIEF DESCRIPTION OF THE DRAWINGS

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale.

FIGS. 10A-10G show screen shots from the computer program operating on a computer processor.

FIGS. 11A & 11B show additional uses of the inventive system for.

FIG. 12 shows a report of images and corresponding information from an event.

DETAILED DESCRIPTION

The following description of the inventive GoodEye system is merely exemplary in nature and is in no way intended to limit the invention, its application, or uses.

As discussed in detail below, one of the inventive features of the GoodEye system is that there is no cropping other than the initial cropping of the source image to the effective image. Additionally, according to the present invention, the effective image is predefined in the system to fit within a composite image along with a logo, banner or other overlay, and the effective image is used for the live view image. It will be appreciated that the live view can be a viewfinder image and/or a view screen image that may be provided by the camera's display screen panel, a computer display screen or even a display screen on a mobile communication device, such as smart-phones and tablet computers. The effective image is not only the portion of the composite image that shows through on prints and other output images after being masked or covered by the other image elements, it is the same image that is being displayed in the live view as the picture is being composed and it is also the image that can be displayed or saved as a preview image, one or more partial-size images and the full-size output image. Accordingly, the live image that is displayed by the GoodEye system is the same effective image that the system will use to populate composite images and other output images without any cropping to the effective image. The effective image may be used by itself or as a part of the composite image in an output image for physical prints or for electronic digital outputs, such as a thumbnail display, web posting or e-mail delivery or for slideshow presentations, big screen displays or other uses.

Figure 1:
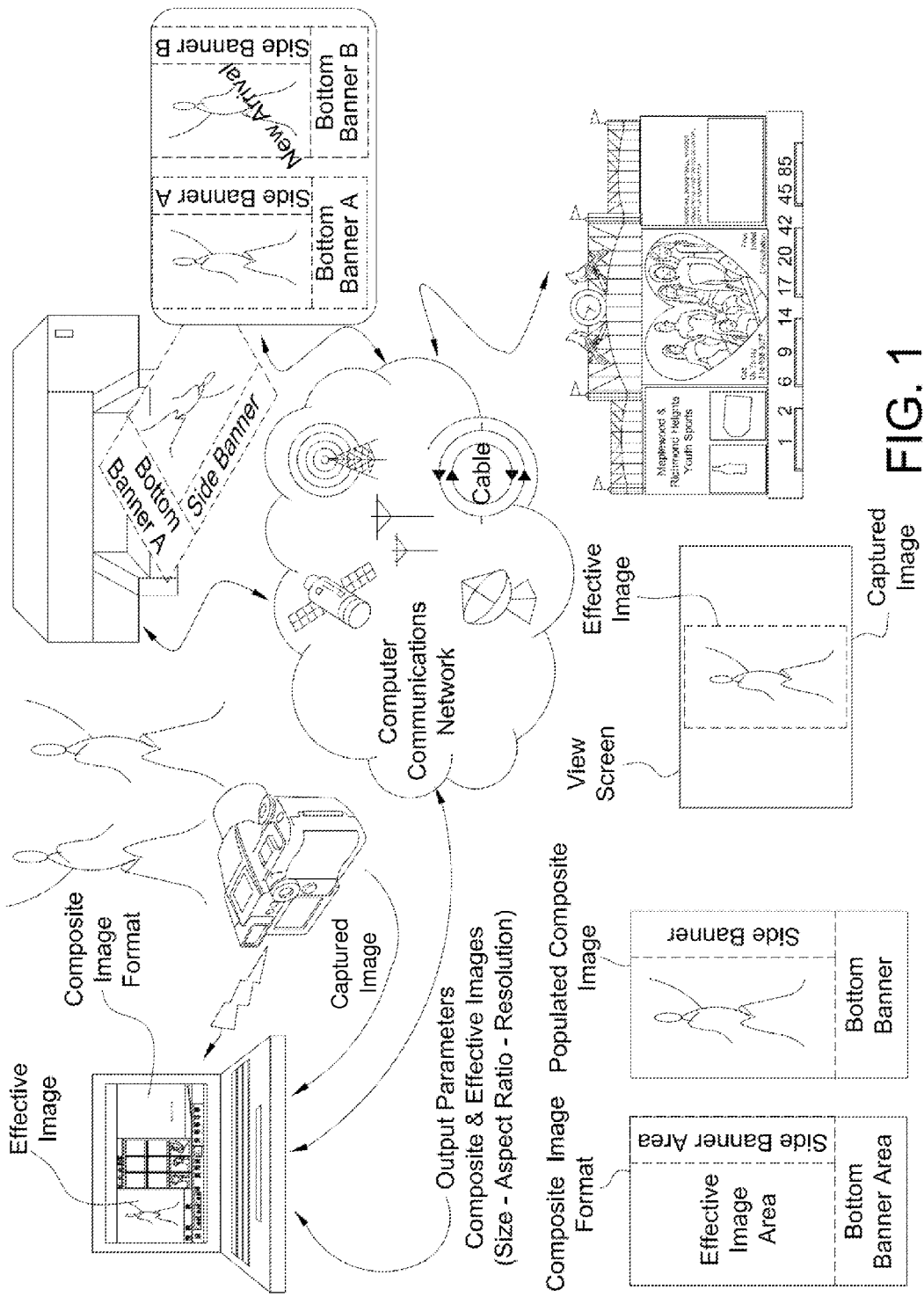
FIG. 1 shows various elements of the real-time imaging system invention with image capture and immediate image output.

As generally shown in FIG. 1, the effective image is formed by automatically cropping the source image or the picture that is captured by the camera's digital imaging device, such as a charge-coupled device (CCD) imaging sensor. According to the present invention, the cropping is defined in advance and is performed in real-time as the images are transferred from the camera to the computer or may be performed within a camera computer processor, such as when the image is cropped when displayed on the camera's viewfinder or its view screen. This feature of the inventive system avoids the additional lossy compression, rotation or scaling step that would typically be used by previously known image processing systems.

Figure 2A:
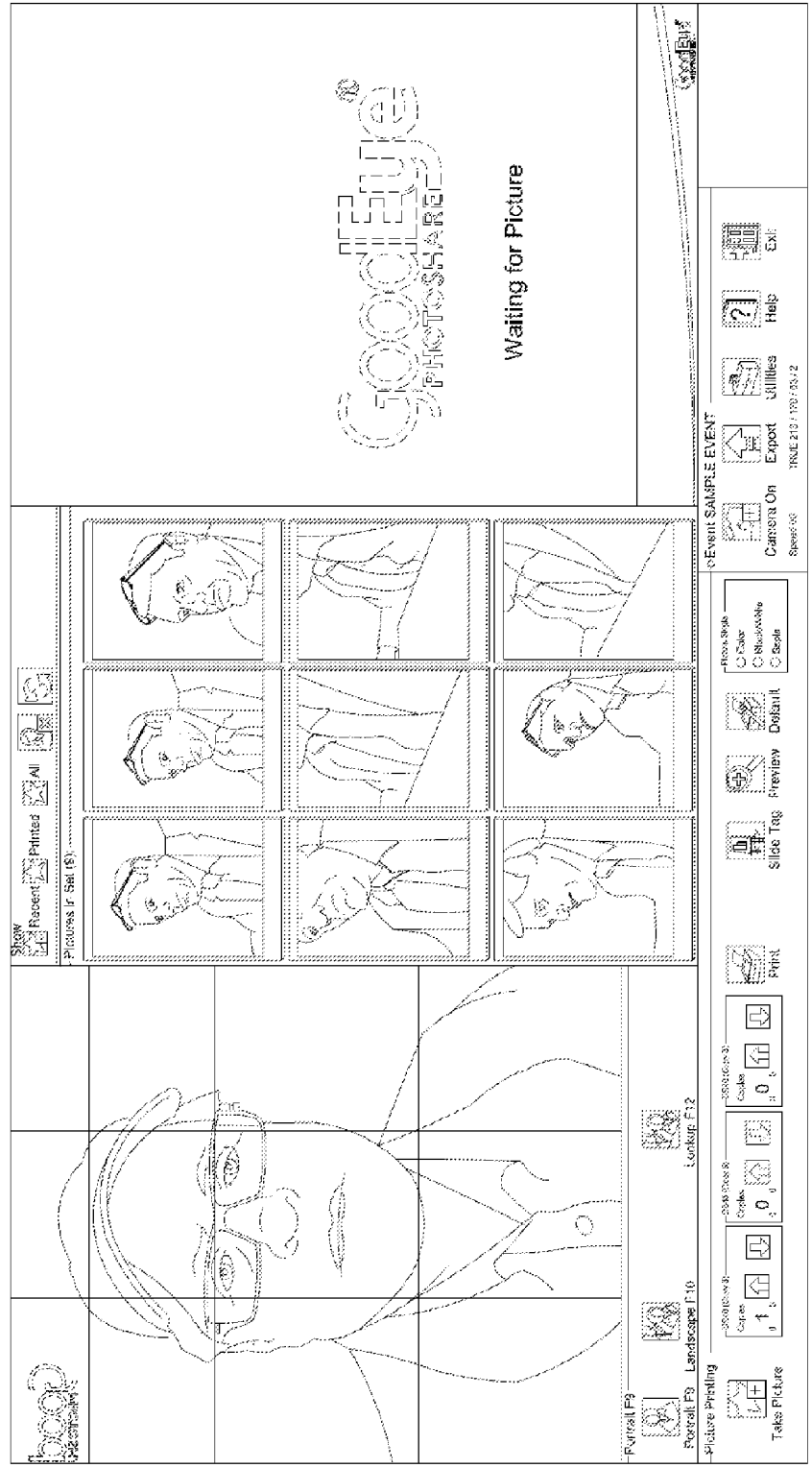
FIGS. 2A-2C show the real-time imaging system invention in a portrait orientation.
Figure 2B:
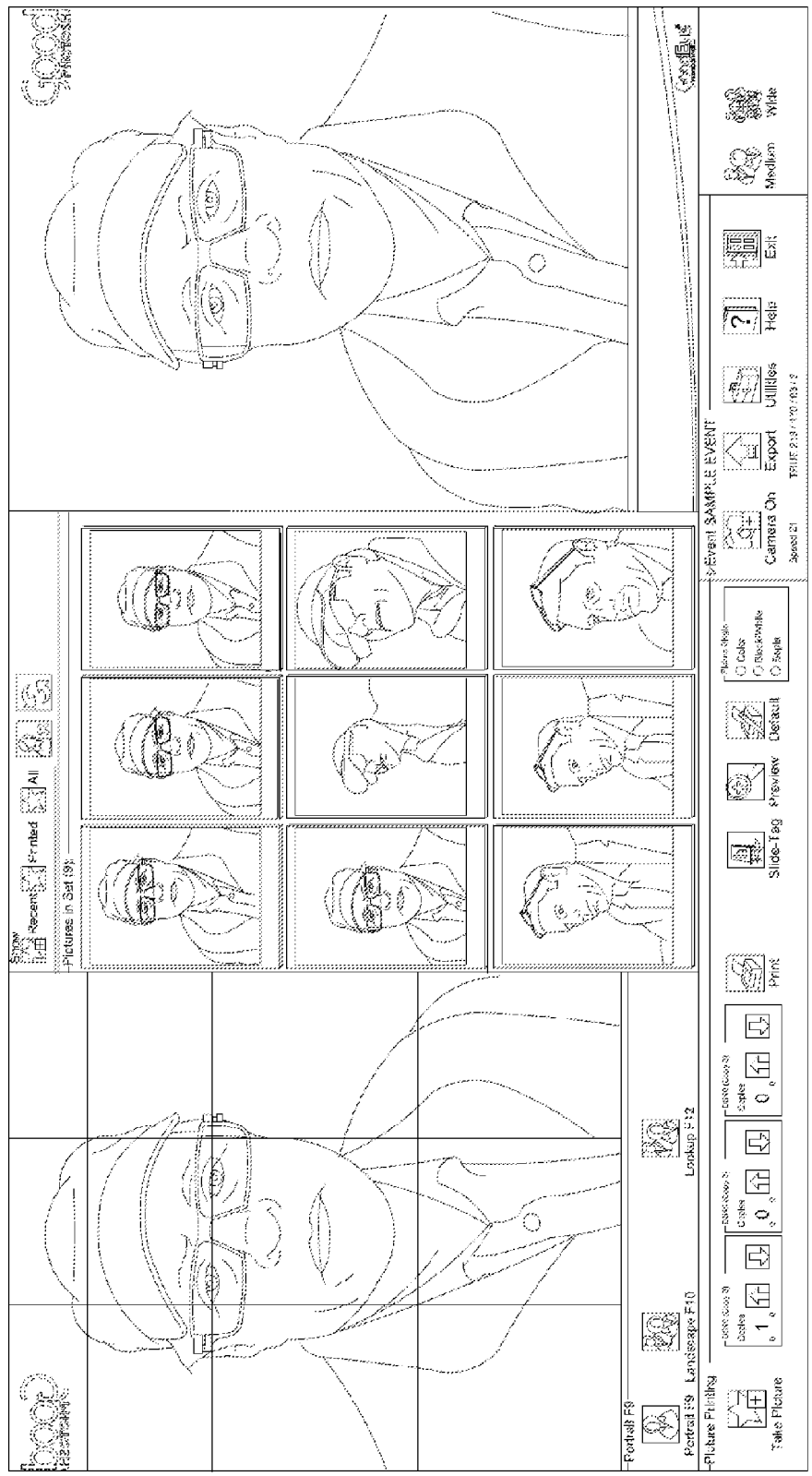
Figure 2C:
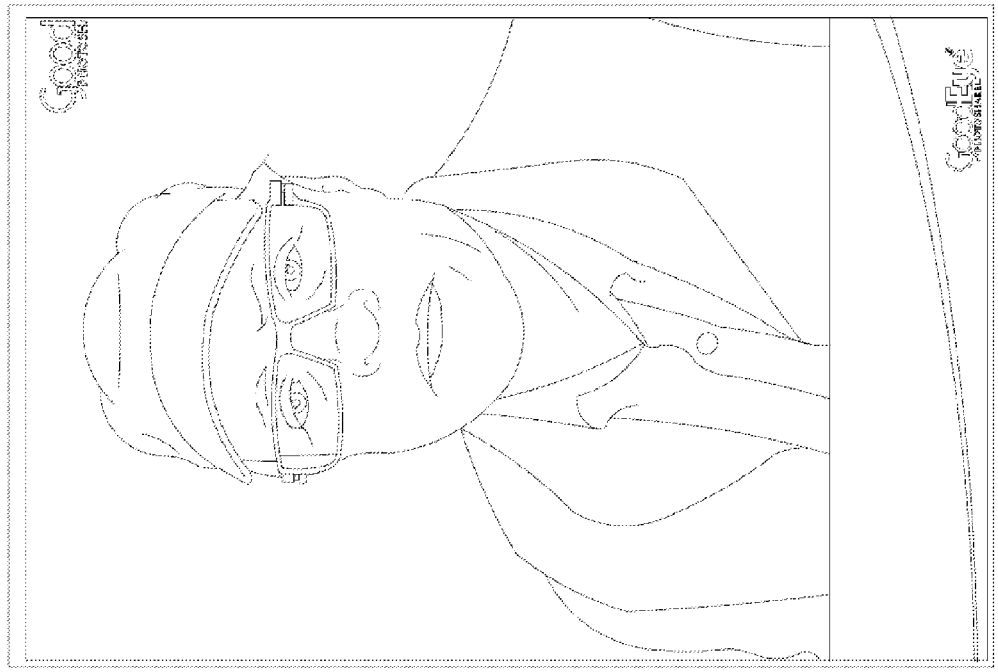
Figure 3A:
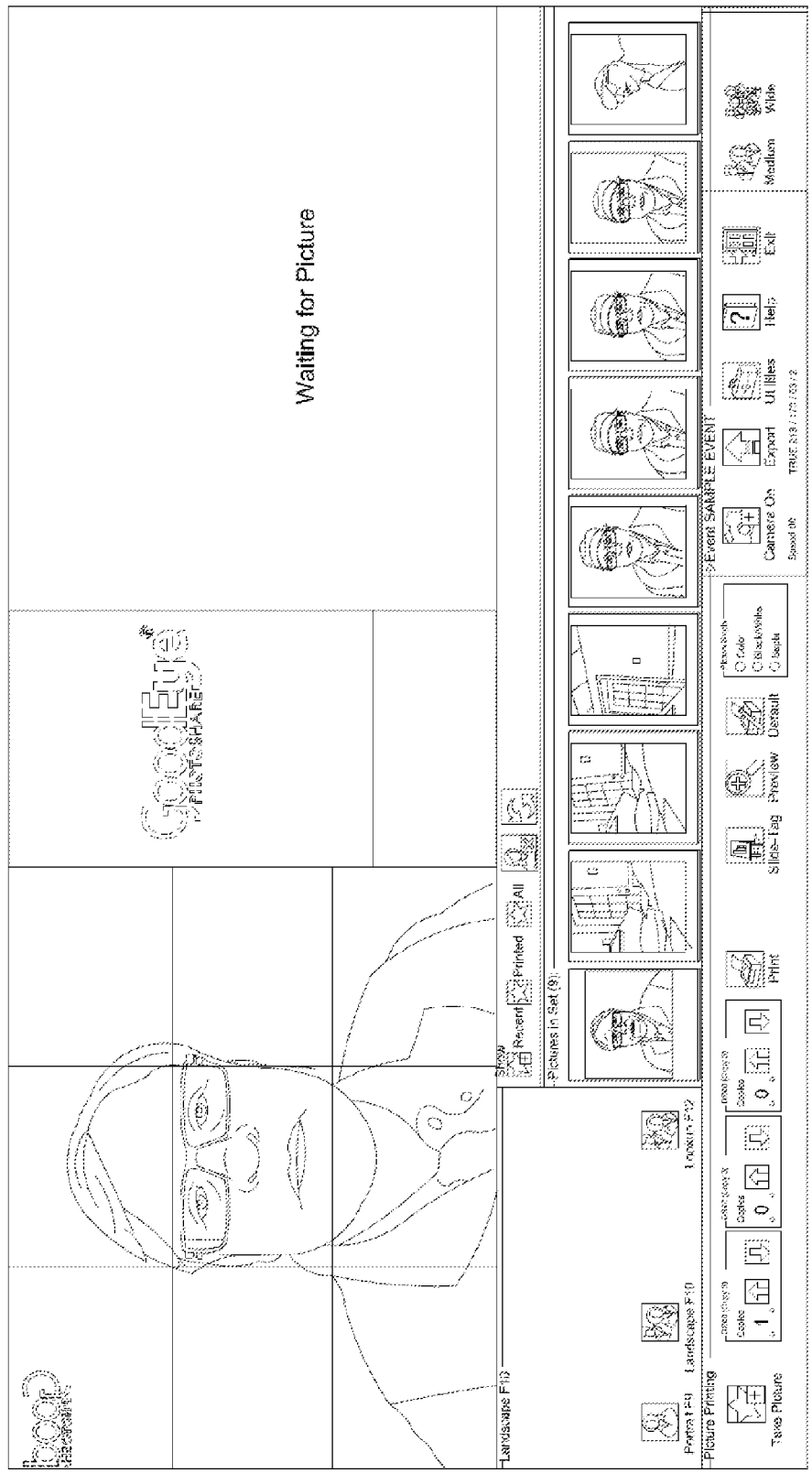
FIGS. 3A-3D show the real-time imaging system invention in a landscape orientation.
Figure 3B:
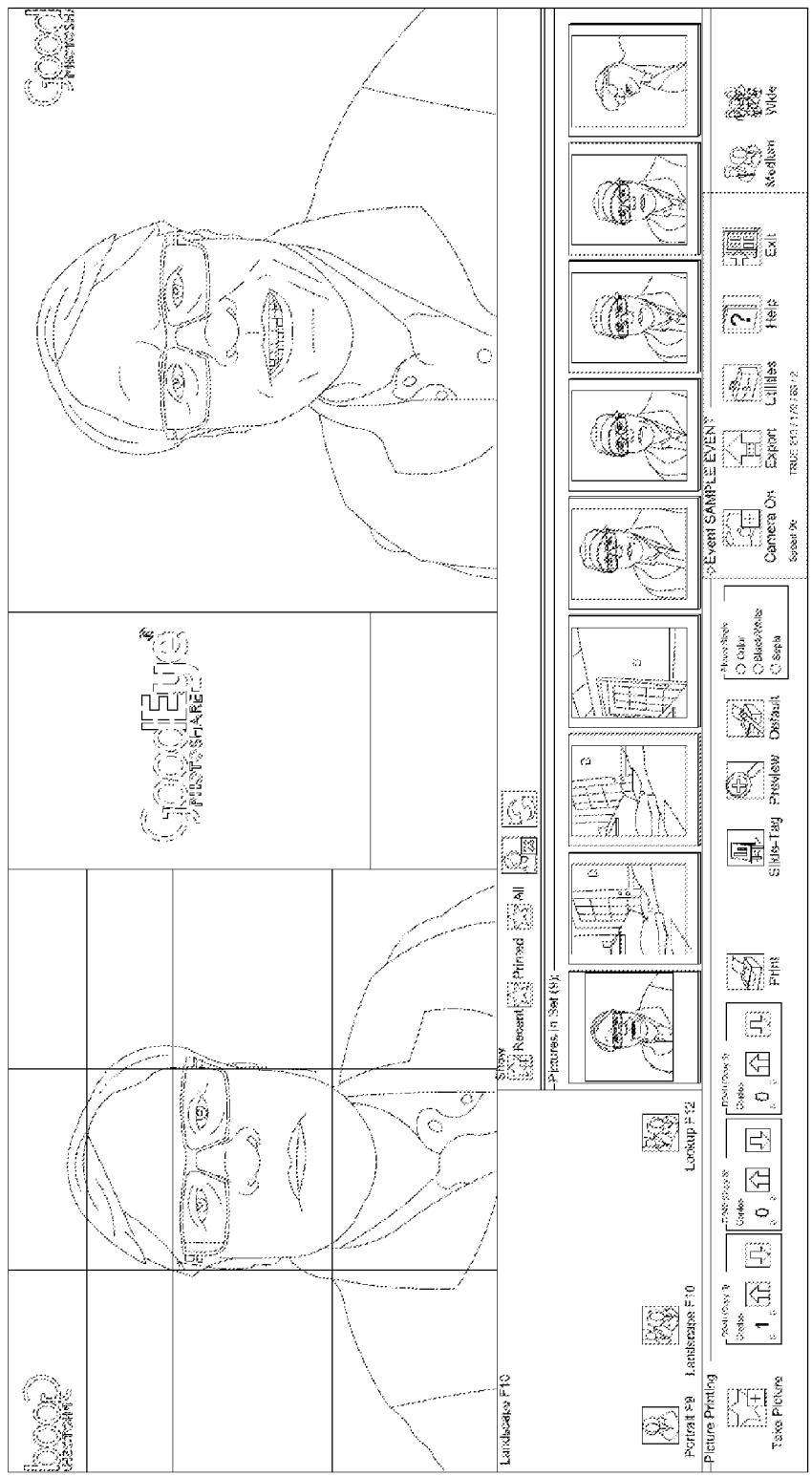
Figures 3C, 3D:
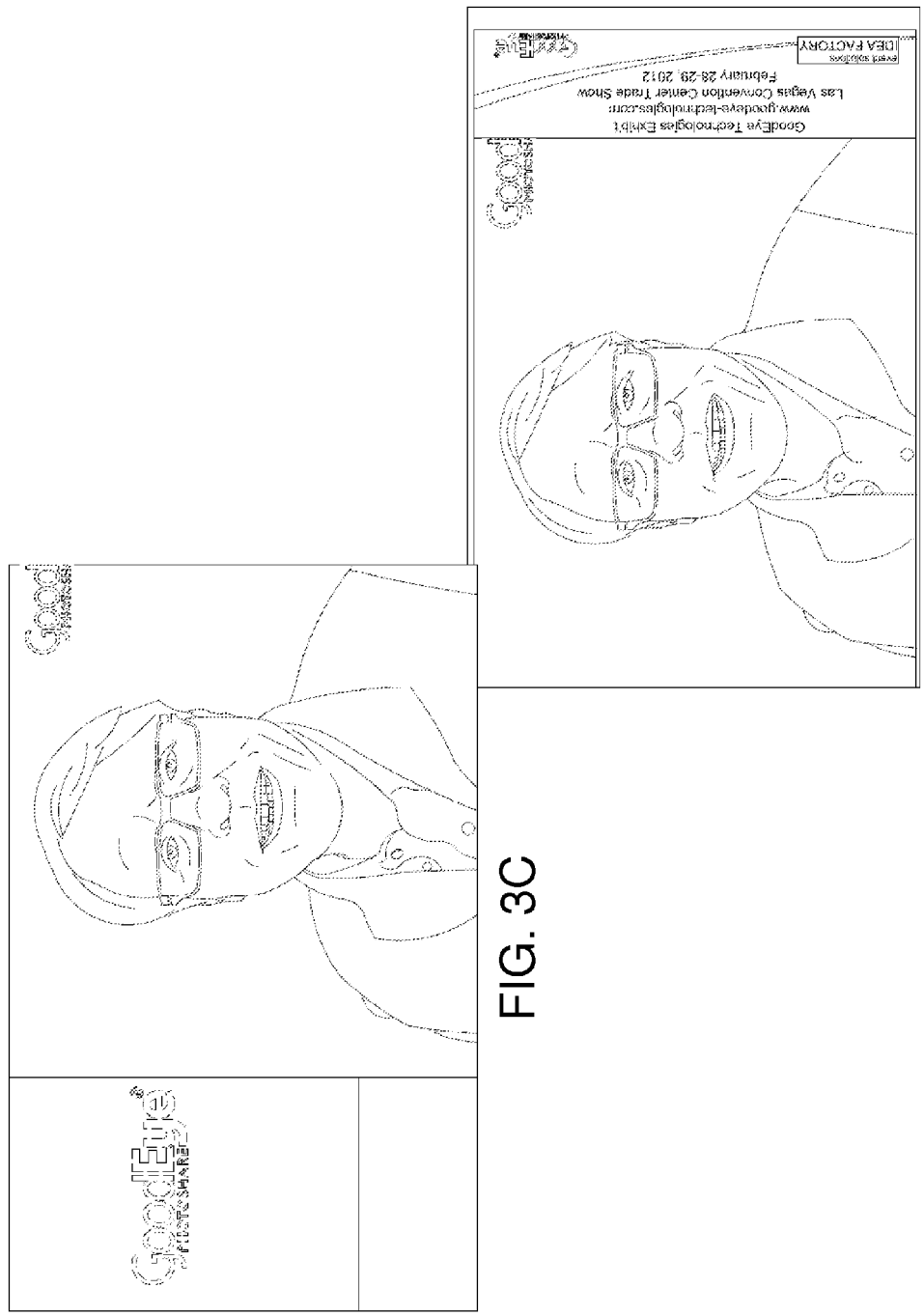
Figure 4:
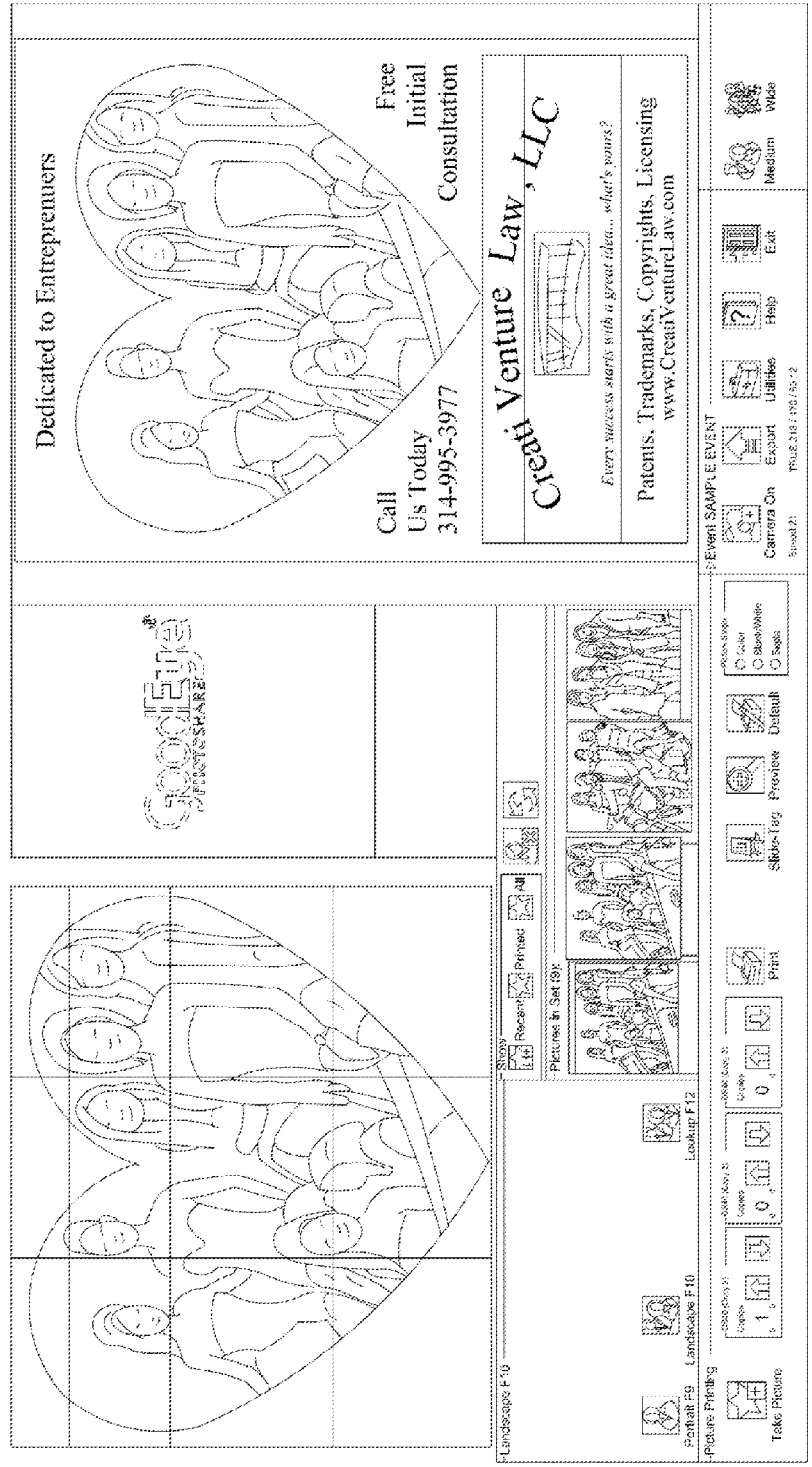
FIG. 4 shows a live view with a banner in a non-rectangular shape and the corresponding composite image.

In general, as shown in FIGS. 2-4, an output format is selected and a composite image is defined corresponding with the output image format. The output image format for the present system can be defined by a print format or any other output format that may be desired, including outputs that may be used in digital forms for electronic devices or communications. An effective image area is also selected. The effective image area is less than or equal to the composite image area. As indicated above and shown in FIG. 5, the effective image may be the entire source image and will more likely be cropped according to a desired aspect ratio (AR) and orientation that will fit into the composite image or will otherwise form the entirety of the composite image. As shown in FIGS. 2A, 2B, 3A, 3B & 4, the display screen also shows live images in the aspect ratio and orientation that is equivalent to the effective image area. This allows the photographer, who may also be subject in self-portrait situations, to precisely visualize the composition of the effective image on the live view in the same manner as it will be incorporated into the output image, thereby eliminating the guesswork inherent in previously known systems in which the live view image would require some cropping to the aspect ratio that fits the output format or may require a digital rotation to the orientation of the output format.

Figure 6:
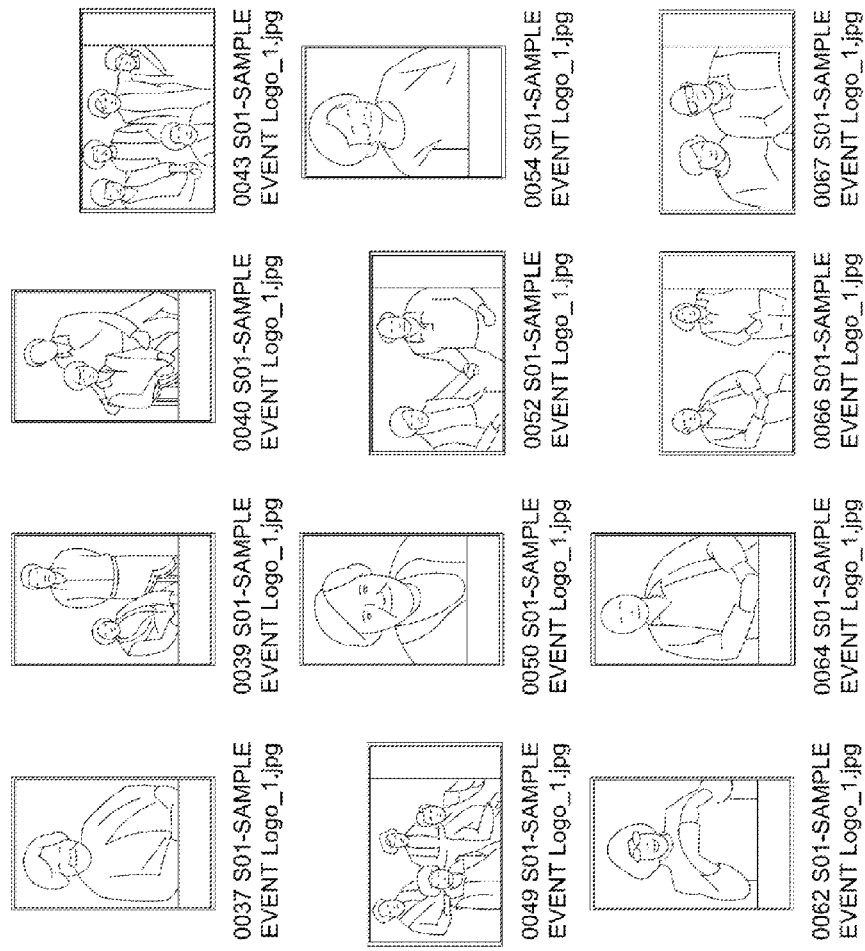
FIG. 6 shows a sequence of composite images with effective images varying between a portrait and landscape orientations.

In the process used by the GoodEye system, various optional print formats are preferably defined according to corresponding print sizes. A print size will have a particular aspect ratio which may be used in a portrait view orientation or a landscape view orientation as particularly shown in FIGS. 2C & 3C, respectively. As discussed in detail below with respect to the settings utility program and FIGS. 10A-10G, a print format is selected from the optional print formats, and a composite image format that corresponds with the selected print format is defined accordingly. As indicated above, the composite image format has an effective image area and can also include an additional banner area and/or an overlay area. According to the present invention, the orientation of the effective image can be arranged as a portrait view or a landscape view and shown in same orientation in the live view image without needing to rotate the camera which, along with predefined composite images having one version automatically selected for a landscape orientation and other version automatically selected for a portrait orientation, allows the system user to quickly create and compose the picture based on a wide variety of subjects and immediately switching back and forth between orientations for a sequence of shots, such as shown in FIG. 6.

It will be appreciated that this creation of the composite image format can be performed for any output image format that may be used for physical prints and/or digital outputs, and the composite image format can be formed by the logo, banner or other image(s) in the banner area in addition to the effective image or can be formed by the entire effective image, and in either event the composite image may also have one or more overlay images. Also, as discussed in detail below, an overlay may be placed on a digital output without printing the overlay on the physical print, and such a digital overlay can be temporary so that it is not saved with the effective image or as a part of the composite image. As respectively shown in FIGS. 2, 3 & 4, both the composite image and effective image may be in a portrait orientation, or both may be in a landscape orientation, or one can be in a portrait orientation while the other is in a landscape orientation. The settings utility program allows the user to define and vary the formatting of the effective image and the composite image.

Following the creation of the output image formats as described above, live scene images are transferred from a camera to a computer according to the image capture size of the camera. A maximum area of the image capture size is determined for the portrait/landscape orientation that is selected for the arrangement of the effective image area in the composite image format. The live scene images are displayed on a display screen of the computer in the arrangement of the effective image area, and an image is captured by the camera.

The captured image is automatically transferred from the camera to the computer upon completion of the capture step. In one embodiment, the captured image is automatically cropped in the computer according to the effective image area, and the effective image area populates the composite image format which can be sent to the printer as a final print format. The entire source image may be transferred from the camera to the computer and then cropped to the effective image, and it will be appreciated that cameras may incorporate the cropping functionality into the camera's processor which can crop the source image to the effective image before it is communicated to the computer and before the image is saved to the camera's storage device, thereby saving storage space. In an advanced camera system, it may even be possible to use the cropping functionality of the present invention to limit the active CCD elements on the imaging sensor to only those elements that are within the effective image.

It will be appreciated that the system of the present invention can switch between a portrait view orientation and a landscape view orientation without rotating the camera. Instead of rotating the camera to vary the orientation of the view, the effective image area is varied in a manner that is similar to the variation of the aspect ratios, by cropping the source image as it is displayed in the live image that on the view screen of the computer or the camera's viewfinder/display screen as well as the corresponding captured image that is stored by the computer and possibly even the image stored in the camera. While it would also be possible to always display the full source image and merely format a frame superimposed on the source image which indicates the aspect ratio and the orientation of the view according to the teachings of the present invention, it is preferable to display only the effective image area as the selected cropped portion of the source image without displaying the discarded cropped portions of the source image that will not form a portion of the output image because this helps the user format the composition using the live image that will ultimately be captured and incorporated into the composite image.

Figure 10A:
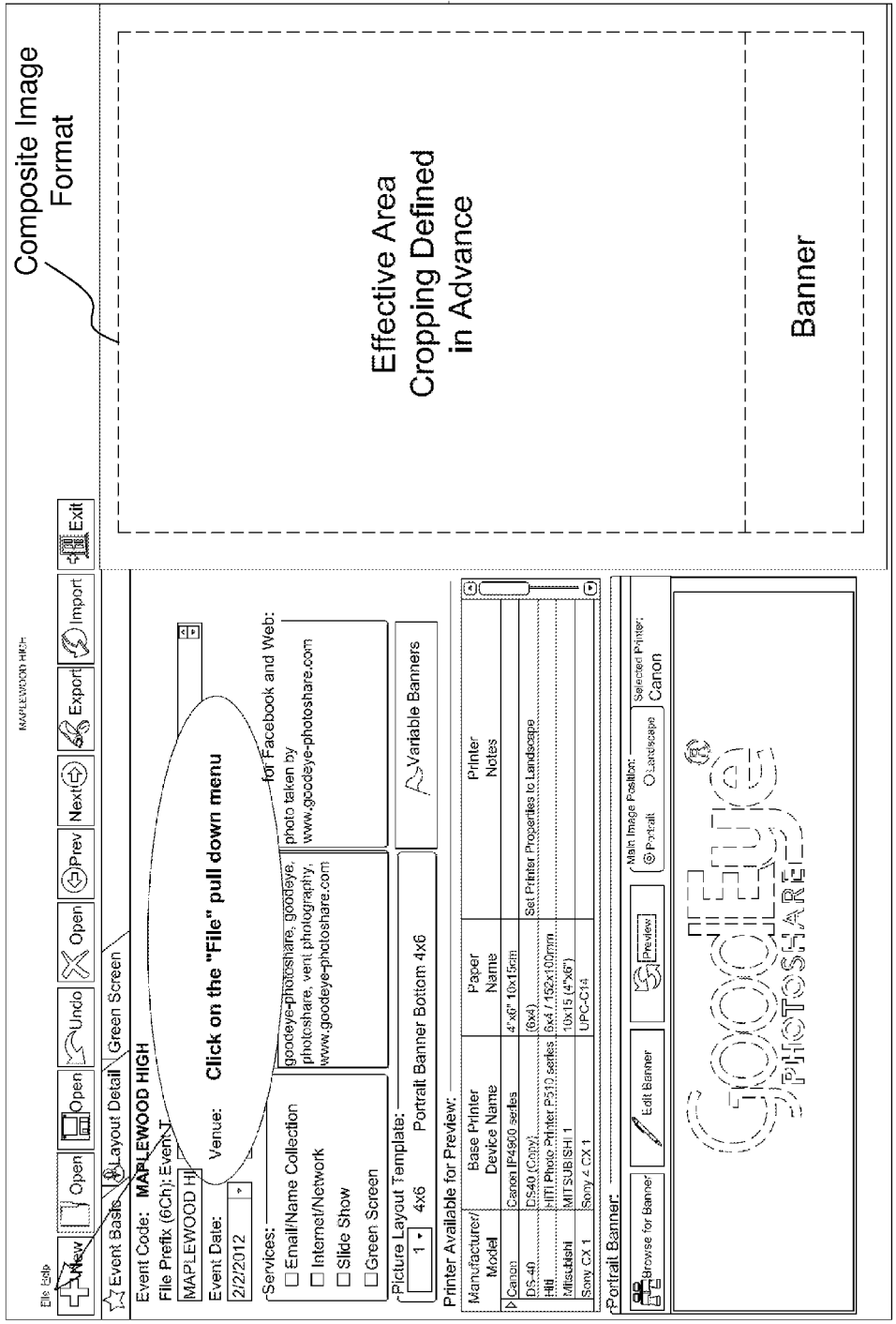
Figure 10B:
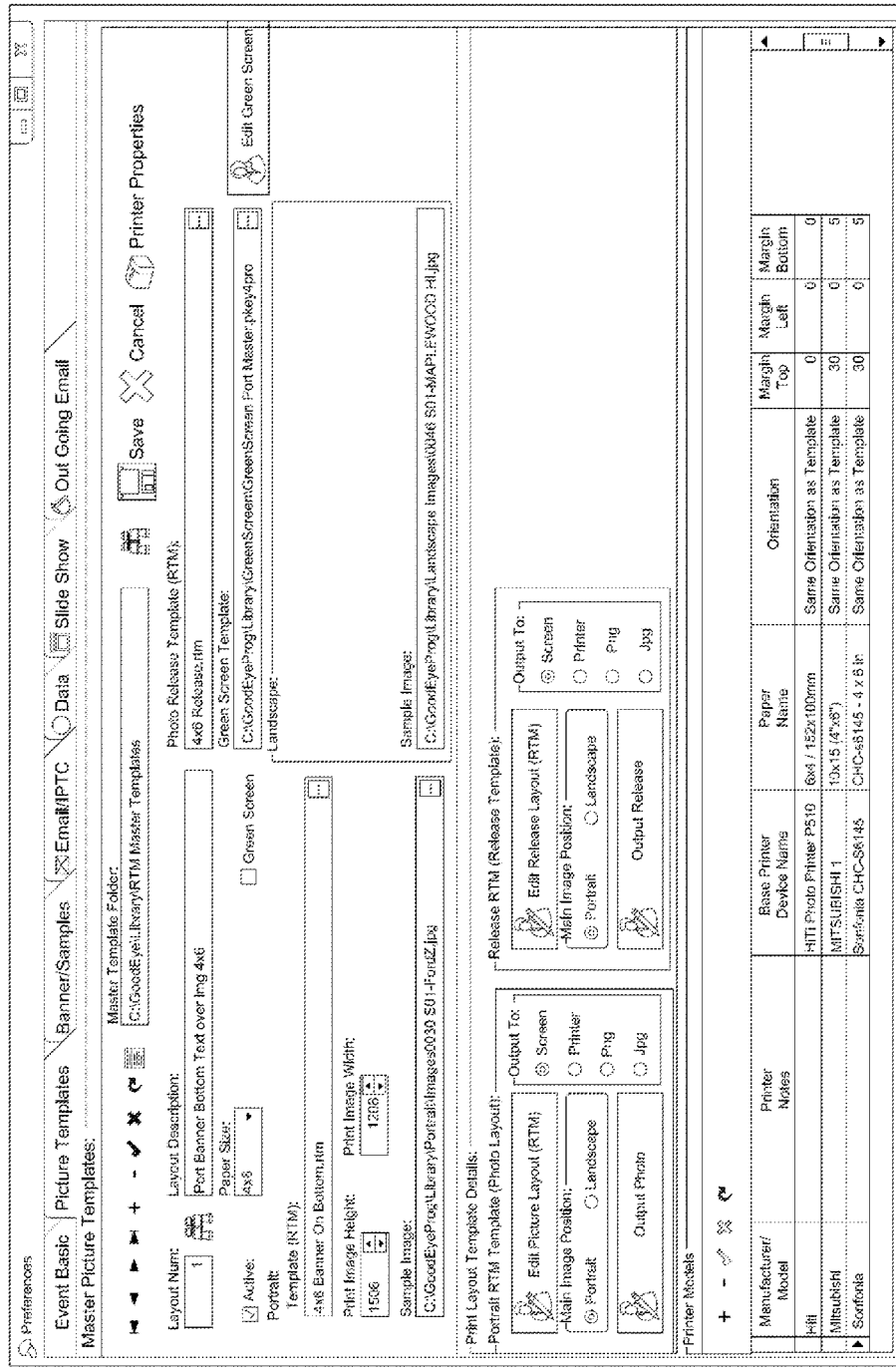

As particularly shown in FIGS. 2B and 3B, the display of the effective image can be a minor image, or a reflected image effect. Such mirroring is especially helpful for self-composed pictures, such as shown in FIGS. 2A, 2B, 3A & 3B (i.e., where the subject composes themselves within the effective image area). It is also possible to show the subject in a standard view, without any reverse imaging, as shown in FIG. 4. It will also be appreciated that the subject can be placed in front of a monochromatic screen (such as a "green screen"), and the computer can incorporate any scene or image into the background. The option for a Green Screen Template is shown in FIG. 10B.

Other systems are known to vary the aspect ratio of an image that is captured by a camera, but these other systems are incapable of changing the orientation of the image view from a landscape format to a portrait format or from accepting image information for other elements that may be added to the effective image area to form a larger composite image. In comparison, the present invention not only allows the user to vary the aspect ratio, it allows the user to vary the orientation of the image being viewed without rotating the camera and also permits the user to combine the effective image area with other image elements to form a composite image area.

The GoodEye method produces the characteristic that the effective image maintains its proportions and its content all the way through the system, from its initial cropping as the live view to its capture and formatting into the composite image and the final output image which may be a physical print and/or a digital output. Therefore, the live image in the viewfinder or view screen that is displayed to the photographer or self service photographer precisely matches the captured effective image and the output effective image that may be printed or otherwise published or saved electronically. According to the present invention, the live view image matches the preview which displays the still photographs taken for review, the thumbnails of recently taking pictures for comparison, and the plurality of digital image sizes produced for output devices from touch screens, to slide show displays and other digital presentations, to print output on various sizes of media, as well as reduced size images for use on web pages for in e-mails and other use. Also, the live view image may have overlays which help with arranging the subject to match the final composition.

Some live image overlays may be lines that break the image into sections, such as the "top-of-head" line shown in FIGS. 2 & 3 which are not printed or saved with the captured image. Typically, the live image overlay lines for the viewfinder are orthogonal, but overlays are not limited to orthogonal lines and they can even be a shape, rectangular or non-rectangular, that would match the overlay shape or banner that may be designed for the final composition, such as in FIG. 4. When a non-rectangular overlay shape is designed for use with the final composition, it would be particularly helpful in setting up the subjects to have the same overlay shape in the viewfinder. Other overlays images can be placed on a digital output version of the composite image, such as with an overlay which provides an announcement of someone at an event. Such an overlay may only be temporarily displayed for a period of time and then the overlay or different overlays may be displayed at other times. Temporal overlays are not necessarily even printed on the physical print nor is it necessarily saved with the output image.

Figure 7:
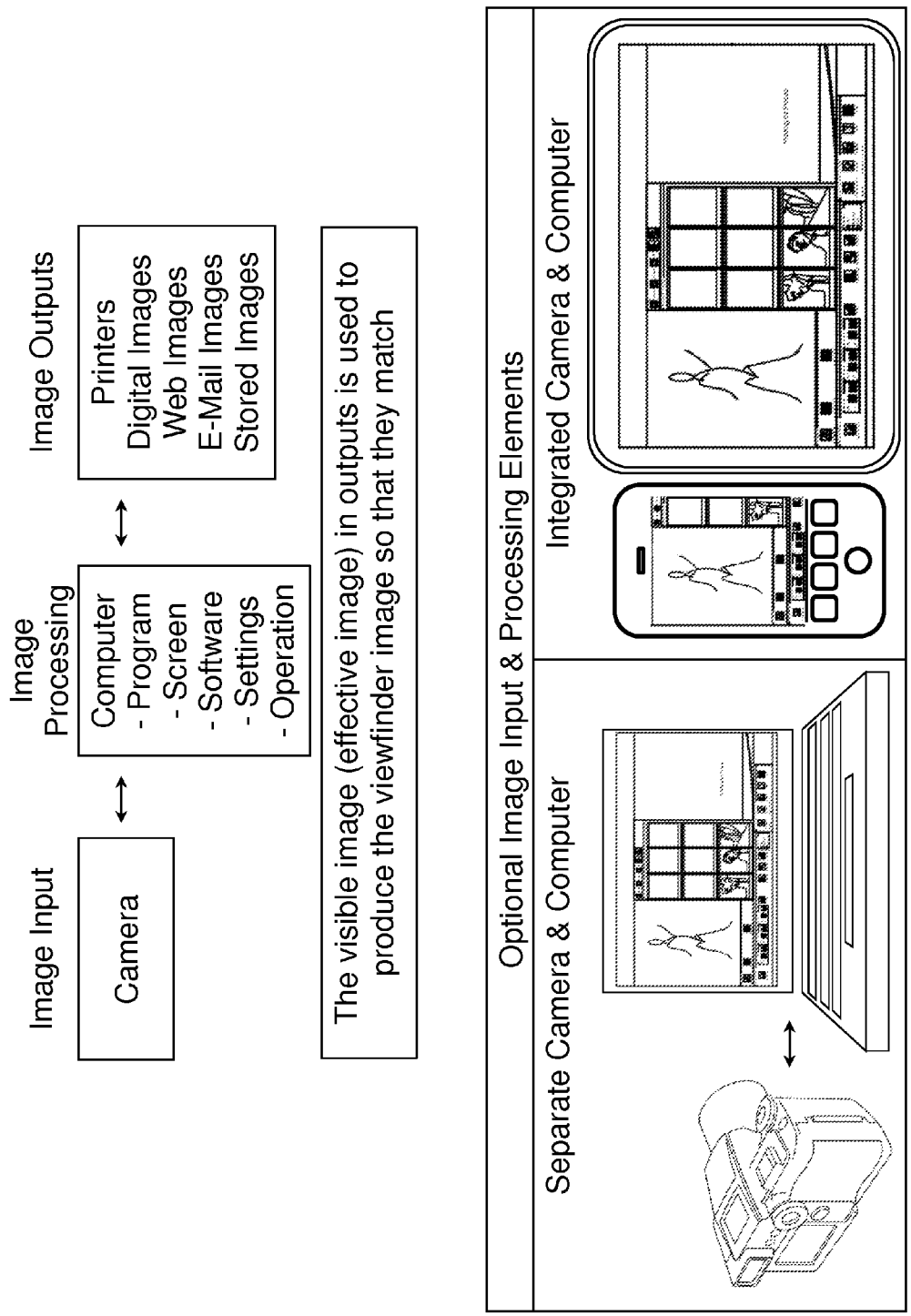
FIG. 7 shows a schematic view of various elements comprising the real-time imaging system.

As indicated above, the live view image can be shown on any type of a view screen, such as within the camera's viewfinder and/or a live display screen that may be on an exterior panel of the camera or the display screen of a computer that is in communication with the camera. Additionally, smart-phones and computers, including tablet computers, are increasingly being fitted with their own cameras. Accordingly, this invention is not limited to the particular type of camera that is being used to display the live scene on some type of view screen and to capture an effective image of the scene within some form of storage medium. For example, without departing from the scope of the present invention, the GoodEye system could be incorporated into an application on a tablet computer or smart-phone that has its own camera, computer processor, and view screen. Most smart-phones have the ability to send captured images in messages, e-mails and through other communication means, including wireless communications and hardwired communications, and can even interface directly with a printer, a storage device or other output. The general system features of the present invention, including the image input, the image processing and the image outputs are schematically displayed in FIG. 7. It will be appreciated that the system can use a separate camera and computer as in the traditional real-time imaging systems or may be integrated together, such as in a smart-phone, tablet computer or other mobile communication device which has its own camera as well as a processor, display screen and communications module.

Figure 8:
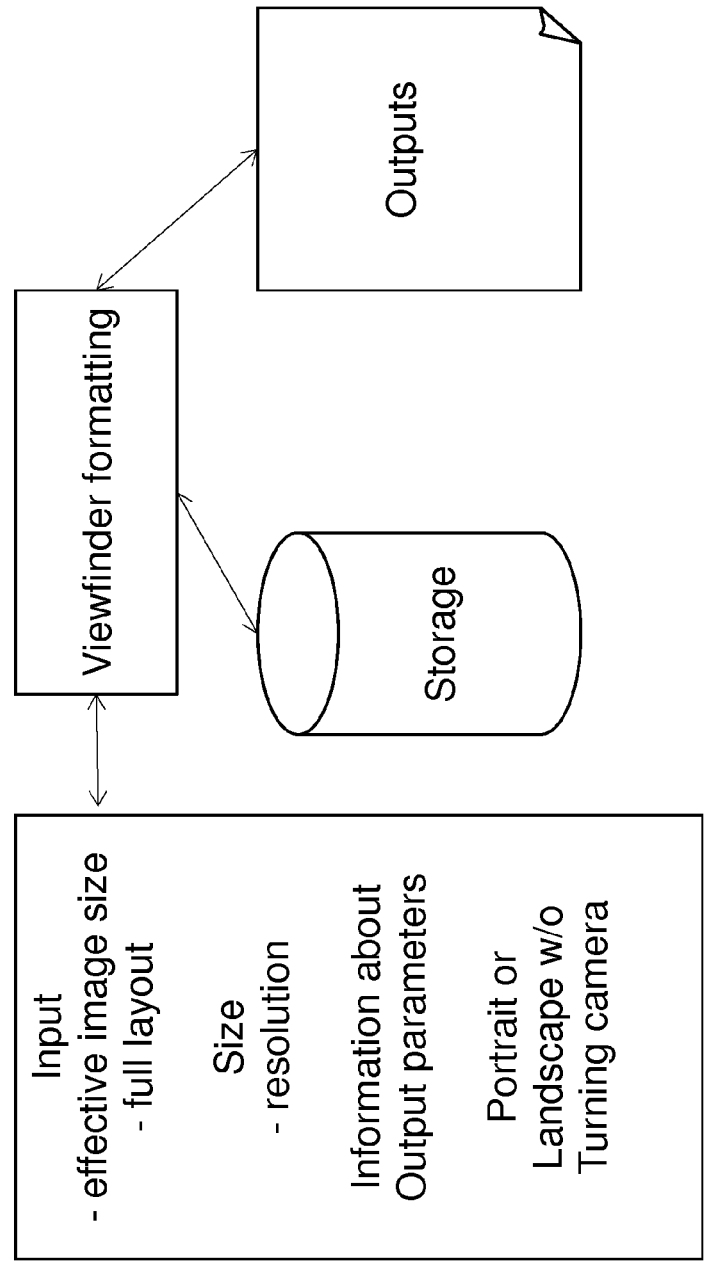
FIG. 8 shows a system diagram of the computer program used in the real-time imaging system invention.
Figure 9:
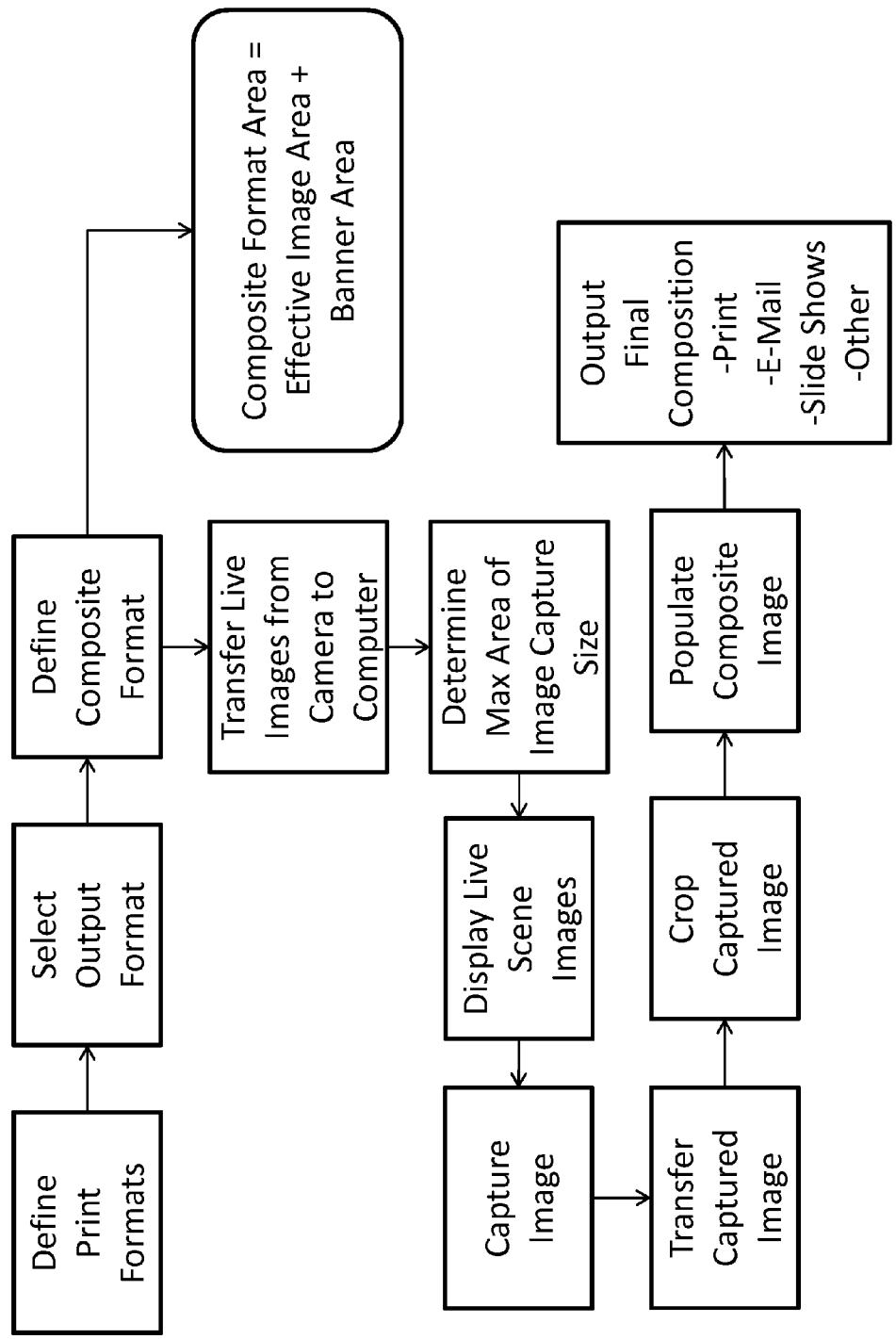
FIG. 9 shows a flowchart of the process performed by the computer program operating on a computer processor.

The system diagram of the computer program is shown in FIG. 8, and the flowchart of the process is shown in FIG. 9. Generally, in producing uniformity from the beginning of the process through the various image processing steps, the present invention overcomes multiple technical challenges. One challenge is the different resolutions and aspect ratios (AR) and sizes for various image input and output devices. The resolution refers to the number of picture elements per unit of area like square centimeter or square inch, and the aspect ratio is the ratio of the height to width. Some displays show images that 96 DPI (dots per inch), which is one edge of the area square. Physical prints of photographs have several standard sizes and corresponding aspect ratios (AR), such as four by six inches (2:3 AR), five by seven inches (5:7 AR), and eight by ten inches (4:5 AR). In comparison, display monitors commonly have aspect ratios of four by three (4:3 AR) or sixteen by nine (16:9 AR—wide screen) and other ratios also exist. The size commonly refers to the total number of pixels comprising an image calculated by multiplying the total number of pixels of width times the total number of pixels of height.

High resolution CCD cameras produce images that are so large that significant delays can occur in moving the image from the camera to a computer and/or to a printer or other digital storage device. In practice, large amounts of information may be discarded during the transfer of the image files by automatic processes performed by one or more of the devices in order to reduce the effective size of the image and speed up the transfer or other processing. Accordingly, a web browser's display of a thumbnail image having 96 pixels by 96 pixels requires vast amounts of information to be discarded from an eight mega-pixel original image. It is much more efficient to simply create an appropriately sized image for various uses, such as sizes that are appropriate for thumbnails, web page images, texted pictures or e-mailed pictures.

Modern cameras also allow the selection of lower resolution and therefore smaller size images to be taken initially. This can result in reduced times that are required to transfer the picture through the system. Also, the processing of the composite image is faster with the lower resolution image. Of course, the resolution that is satisfactory for a particular usage of the system depends on the final quality of the output image that is desired.

The user can use the GoodEye system to balance all of these factors to establish identical content showing on the output image produced from the system according to the same effective image that is first viewed as the live image and then processed through the system as explained above. This balancing of factors involves prior planning. Accordingly, the system software contains a settings utility program for configuring certain aspects of the operation and use of the GoodEye system. Screen shots from the settings utility program are shown in FIGS. 10A-10G. In balancing satisfactory quality for the image resolution with good processing speed of the system, the end result of the output image is considered. For example, with real-time image capture, formatting and printing at events, the prints are typically less than or equal to 8"×10" and in such a case, 300 dpi resolution is satisfactory. Accordingly, the system may capture the effective image at the full native resolution of the camera's source image, which can have a pixel resolution that allows for printing at much greater resolutions than 300 dpi for such relatively small prints, and since only the 300 dpi resolution is required, the system may save the effective image at the camera's native resolution and manipulate and possibly store the composite image based on the 300 dpi resolution for a particular size print. For example, for a 300 dpi 4"×6" print, the full frame print would be 1200×1800 dots (4*300×6*300), and if there are banners and borders in the print, the effective image may be 1200×1500 dots. The system is able to make maximum use of the camera's native resolution while accounting for the resolution that is sufficient for the various images being output by the system, including prints and digital outputs. Regardless of the ultimate print resolution, the maximum portion of the source image is captured by the system according to the desired aspect ratio and orientation of the effective image.

The "picture templates" tab is selected to coordinate the end product with the viewfinder and subsequently maintain on cropped images through all the intermediary and alternative output steps. As shown in FIG. 10A, the "picture layout template" panel offers the available layouts for the system as it is configured. This usually includes a landscape and a portrait layout. Two numbers are required: the print area height and printing area width. The print area height and the print area width can be found from an examination of the layout. The layout of the picture is composed by a technician and includes the image, a side or bottom banner, or icons, logos, counters, comments, captions or other elements that obscure portions of the total print area. Of interest is the part of the image height and width that finally shows in the finished layout because it defines the content of the images processed by the system. A detail view of the options available with the picture layout template is shown in the detail view of the "picture templates" tab shown in FIG. 10C, and a completed formatting of a composite image with the template effective image and a banner is shown in FIG. 10E.

Figure 10D:
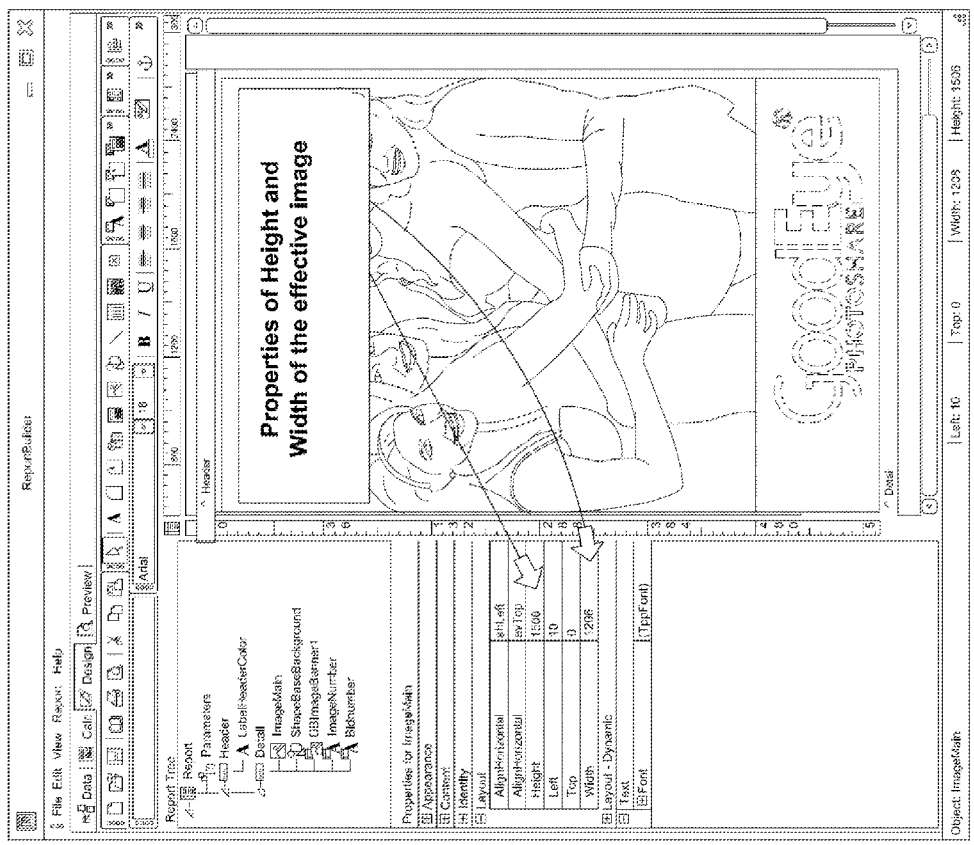
Figure 10E:
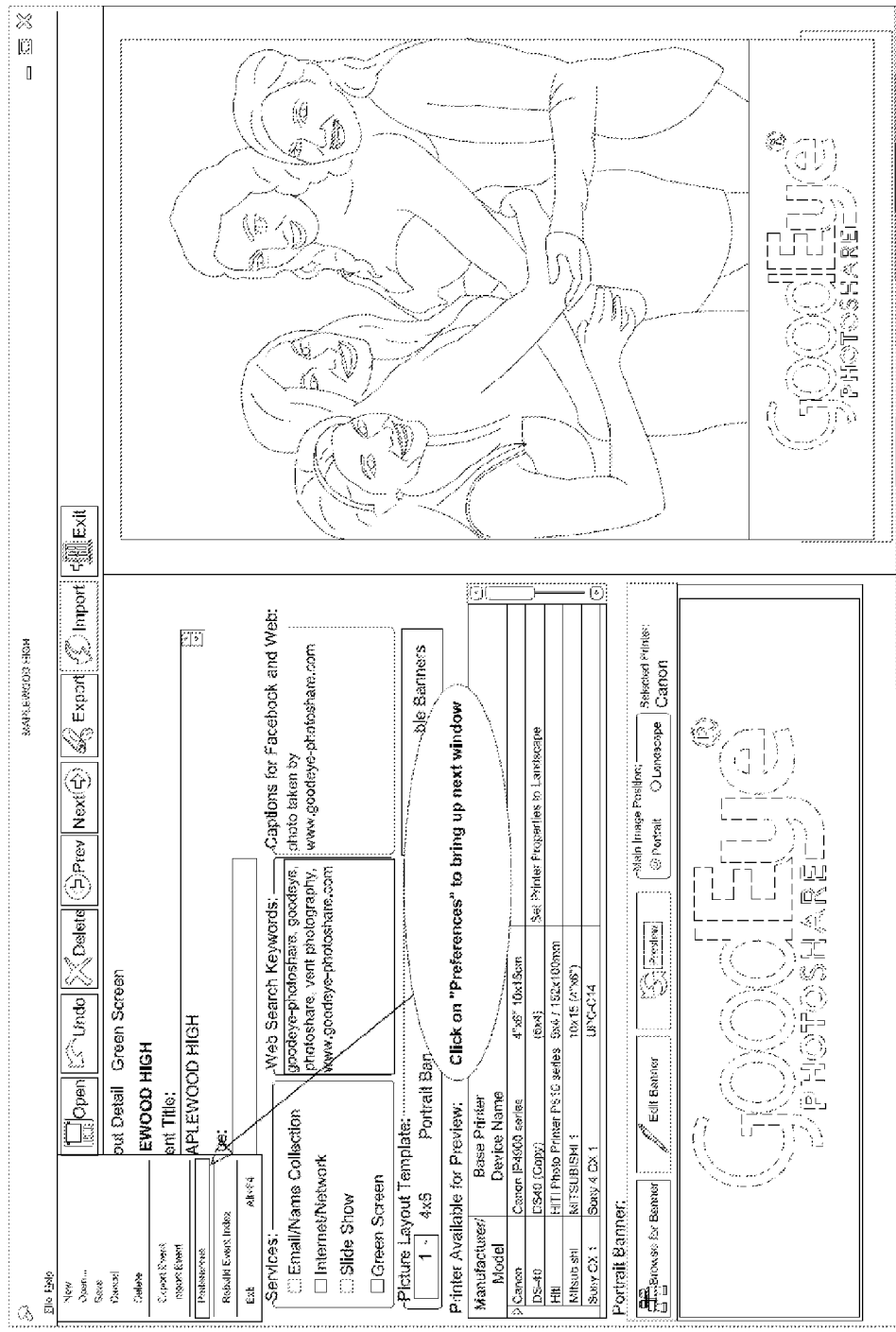

By selecting the Edit Picture Layout® button as shown in FIG. 10B, the system provides the user with a report builder layout tool that is shown in FIG. 10D. In preparing the overall composition of the composite image in the report builder layout, the user can select a sample image that is taken with the camera that is to be used for the shoot set at the desired resolution to balance quality and speed. This may be done manually by the user or through automation, such as a partial automation with template options or full automation in which there is a live feedback communications link between the system and the desired camera as the composite image is being designed with the report builder layout tool. The sample image template preferably resides in a file that is within a default folder linked to the report builder tool and is useful in serving as the effective image for blocking in the banners and icons and other elements that complete a larger composite image. It will be appreciated that a picture from the camera that is planned to be used in the shoot set is the preferred effective image that should be used to best ensure that the precise height and width numbers of interest are being used in the composite image.

The size of the image obtained from the camera may contain small or large amounts of image sections that do not show through as the effective image size after overlays have obscured portions of the picture, and the selected format of the print, for example four by six, may have imposed other losses of content. The uniformity is defined by the portion of the picture that shows through in this layout. The properties to the left of the layout will display the height and width when the image element receives the focus by clicking on it. In the sample presentation the height revealed is 1506 and the width is 1208. These two numbers are taken from the layout and put in the print area height and print area width fields, respectively.

Multiple printers with differing resolutions and differing paper sizes can be on the system and used at the same time.

The web image size feature creates a reduced size image for use in a web-based display or as an attachment to four as an embedded picture in an e-mail. As stated above, modern cameras take large pictures a very high resolution. This level of quality consumes large amounts of space and generally exceeds the need of relatively low resolution computer monitors used to view websites. Limits on the total size of individual e-mails impose limits on e-mail attachment sizes which may limit the size of the picture. In fact, pictures generally must be reduced in size for both reducing the time required for transmitting them and to fit within size limits set by web and e-mail programs.

On the picture templates panel is found the control to define one edge of a "web sized" image. Because the aspect ratio is maintained and because of the prior processing only this one number is required to produce the desired result. This number is labeled "shortest dimension in pixels of web image attached to e-mail or other:" the value shown in the example is 518. Whether portrait or landscape the shortest dimension of the image produced will be 518 pixels. This is the number chosen by the person creating the layout and allows highly customized control over the size of these reduced images. With the aspect ratio already defined and one edge defined the dimension of the other side and the size of the image result. Another way to select a reduced size for the images would be to provide the user with a percent reduction, such as 10% of the original image size for web use. The system would make the calculations for scaling the image to maintain the aspect ratio for the particular image.

The use of GoodEye custom programming, third party tools and operating system features are combined with operator input to acheive the desired result.

System and Composition

The system consists of a camera, the computer system including hardware and software, and outputs. The technician configures certain parts of the system for operation. An attendant for the individuals in the picture themselves take the photographs and operate the system in real time.

The technician uses a sample photograph to configure the system for use. By doing this coordination is achieved between the end product and all of the various images in the process prior to the end product. This means that the viewfinder actually only displays that portion of the picture which will actually appear in the end product.

The major components of the system are a digital camera, photographic strobe, computer, photo printer, computer software and a mounting stand. The mounting stand holds all the components and electrical connections except for the printers. The position of the camera and strobe light are placed immediately adjacent to the computer screen normally but not always facing the photographic subjects. The live view window is next to the edge of the monitor closest to the camera making the live view image visible to both the photographer and the subjects. This allows the photographer and the subjects to work together to compose the portrait. When a satisfactory pose is struck, the photographer captures the image using the camera shutter release button, the computer program or a remote control. Within seconds, the photograph is displayed on the monitor for review. With known systems, if the photograph is acceptable, the system user can have the system take one or more actions with the photograph: print, e-mail, upload to the web, brand by inserting text and graphics, insert IPTC data for captions/keywords, place in a slide show, archive and copy for back up to external hard drive(s). However, not all of these actions can be performed automatically by the system and require a skilled technician with an assembly of devices making it cumbersome, slow and expensive. With the present invention, these tasks can be done in seconds by a single operator with minimal training because the system can use scripts to perform the actions automatically.

The technological advances in the inventive system allow for highly accurate photo composing in real-time imaging systems with image capture and immediate image output, such as photo booths, photography studios and portable event imaging and printing and optional digital output. In such real-time imaging systems, as soon as the photo is taken, i.e., captured, it is advantageous for the system to automatically populate the image into the final format of the image that will be output. Accordingly, it is preferable that no manual cropping or editing of the image should be performed after the image is captured, i.e., no manual post-processing of the captured image to produce the output image, so it is most advantageous to compose the image in the live view window. As explained in the Background section above, the known real-time imaging systems typically show the source image in the live view image which is not necessarily an exact representation of the effective image that will be captured and inserted into the final resulting print, especially when there are variations in the aspect ratio of the source image and the effective image which can significantly reduce the value of the final print. With the present invention, the effective image that is captured and automatically inserted into the composite image is identical to the live view image that is selected, thereby improving the ability of the photographer to best compose the image using the live view and avoid post-processing.

Plurality of Available Outputs

The final product of the system may simply be the picture or may contain overlays, captions, counters, and other elements as described elsewhere. This picture may be printed on paper as a high quality photograph on any one of the plurality of printers. These printers may be of the same or different formats and resolutions.

The digital image form of these photographs is also produced by the system for use in web browser applications or in the e-mail attachments or in slide shows. The system maintains the exact same content of the image for each one of these outputs handling the varying size and aspect ratio issues of the various use requirements. In many cases, the digital image is saved to storage as soon as the output image is sent to the printer and prior to the next image being captured. Implementations in this system includes storage locally in memory, on disk, on flash drives, on memory cards, and uploaded to remote storage on photo sharing systems and elsewhere.

The system can create a full-sized picture file and the scripts can be used to automatically create one or more reduced-size picture files and to automatically communicate one of more of these picture files to various outputs. For example, as soon as the picture file is communicated to the printer, this can be a trigger event for the system to run a script that automatically takes one or more actions on the full-size picture file and/or one of the reduced-size picture files. For example, as discussed in detail below, the picture file may be placed in a "next in line" slide for a slide show that is being displayed on monitors at the event. Similarly, different sized picture files for the printed picture can be automatically stored in the system's memory storage device or any other scripted action.

Computer Program

Inputs are taken from the technician to configure the system for the specific event, including any printers, web outputs, and slide show displays that may be anticipated for the event. A full image is captured from the camera. That image is used in a layout system which may obscure or crop various portions of that picture.

The remaining image is the effective image. The effective image defines the image which will be seen in the viewfinder while setting up the picture to be taken. The viewfinder displays a live image also recognized as a moving picture allowing people to set themselves up. It also defines the preview display which displays a picture that has been taken. Further, the effective image defines the image that will be seen in thumbnail pictures presented for comparison and selection of the images to be printed or output for use. The effective image also defines the image that will be seen in the slide show or other presentations. Accordingly, these pictures will not vary in edge content which had been necessary in previously known real-time imaging systems, such as in other known photo booth and portable studios.

The formulas, variables, calculations and corresponding examples to resize and center the captured image to match the effective image area for the output image are provided in the tables below. Generally, the system calculates the largest area for the effective image that fits within the source image for a user-selected aspect ratio and orientation where an aspect ratio less than one is a landscape image and an aspect ratio greater than one is a portrait image. Additionally, the system calculates the center of the effective image to be at the same location as the center of the source image so that the camera focus and exposure are centered within the effective image.

| Formulas | |
|---|---|
| Adjusted Image Y | IF(PrintY/PrintX) > (CameraY/CameraX) then Adjusted Y = CameraY else Adjusted Y = CameraX * (PrintY/PrintX) |
| Adjusted Image X | IF(PrintY/PrintX) > (CameraY/CameraX) then Adjusted X = CameraY * (PrintX/PrintY) else Adjusted X = CameraX |
| Crop Area Top | (CameraY − AdjustedImageY)/2 |
| Crop Area Bottom | Top + AdjustedImageY |
| Crop Area Left | (CameraX − AdjustedImageX)/2 |
| Crop Area Right | Left + Adjusted ImageX |

| Variables | |
|---|---|
| Source Image | The image from the camera. Either the photo taken or a frame streamed from the camera live view system. |
| Effective Image | The image created by cropping and centering the Source Image and is used as the live view image for composing the subjects. |
| Output Image | The image that contains the Effective Image and any additional banners overlays or other images in a composite image. |
| Print Area | The height and width of the area that will be contain the Output Image which has the same aspect ratio as the Output Image. |
| "Source Image X" "Source Image Y" | The width and height, typically in pixels, of the Source Image. It can be the photo taken by the camera or a frame streamed from the camera viewfinder. These dimensions can be read from the camera image. |
| "Print Area X" | The width and height, typically in pixels, of the area that will be printed. |
| "Print Area Y" | This may be the size of the paper stock the photograph is printed on. |
| "Effective Print Area X" "Effective Print Area Y" | The width and height, typically in pixels, of the Effective Image area that will be printed in the output image. This will be less than the size of the paper stock the photograph is printed on when the output image has additional banners, overlays or other images in a composite image. |

-continued

| Variables | |
|---|---|
| Aspect Ratio | A calculation of height divided by width. For example a 4 × 6 landscape image has an aspect ratio of .75 and an 8 × 10 portrait image has an aspect ratio of 1.25. |

| Calculation of Image Sizes | |
|---|---|
| Test for existence of source image file | If file Source Image file exists continue if not skip processing and give error message indicating the Source Image file is missing Open source file |
| Retrieve information about area to be printed and source image | Read X and Y dimension properties from Source Image Calculate Source Image Aspect Ratio Get X and Y dimensions of Print Area. This has been entered by the person that created the print layout and is stored on the computer's hard drive. Calculate Print Area Aspect Ratio |
| Calculate area of effective image with aspect ratio in output image while maintaining maximum size of source image | If Print Area Aspect Ratio > Source Image Aspect Ratio then (1) Set the Effective Image Y dimension = the Source Image Y dimension (2) Set the Effective Image X dimension = the Source Image Y * Print Area Aspect Ratio If Print Area Aspect Ratio ≤ the Source Image Aspect Ratio then (1) Set the Effective Image Y dimension = the Source Image X * 1/Print Area Aspect Ratio (2) Set the Effective Image X dimension = the Source Image X dimension |
| Center effective image at center of source image | Top Border = (Source Image Y − Effective Image Y)/2 Bottom Border = Top Border + Effective Image Y Left Border = (Source Image X − Effective Image Y)/2 Right Border = Left Border + Effective Image X |

| Example | | | |
|---|---|---|---|
| | User Set Print Area for Effective Image | Source Image Full Size | Maximum Cropped Effective Image Area |
| Height | 1200 | 2304 | 2304 |
| Width | 1500 | 3456 | 2880 |

| Centering Effective Image | |
|---|---|
| Top | 0 |
| Bottom | 2304 |
| Left | 288 |
| Right | 3168 |

Select Portrait/Landscape Orientation without Rotating Camera or Digitally Rotating Image In known systems, portrait and landscape orientations of pictures are achieved by either turning the camera 90° or taking a picture and digitally rotating it by 90°. Rotating the camera takes time and has the undesirable affect of requiring careful realignment of the camera to avoid skewed pictures or pictures that are not level. The disadvantage of digitally rotating the image is that the quality of the image is reduced. Operating on the image with a digital rotation typically includes a compression and decompression cycle which reduces the quality of the image through what is known technically as lossy compression image quality loss. Additionally, this operation takes additional time to process the image, and for larger image sizes which may be necessary due to the loss in image quality, the longer it will take to process the image. Therefore, when digital rotation is desired to place an image somewhere between a landscape and portrait orientation, such as for artistic purposes, it is best to first obtain the effective image that is true to the actual horizontal and vertical space so that the full-scale effective image can be saved in its highest resolution without loss in quality. The system can then automatically perform a digital rotation to place the image in the format of the composite image.

The GoodEye System achieves the ability to provide portrait or landscape pictures by a button selection on the attendant's screen. The technician has already set up the layout for portrait and for landscape using the image provided from a stationery camera and without rotating the camera and without rotating the digital image by simply changing the orientation of the aspect ratio for the portion of the picture that is used in the final layout. Accordingly, the inventive system avoids both the loss of quality from having pictures that are not straight and it avoids the loss of quality from pictures that have been digitally rotated with lossy compression algorithms (JPEG and other formats commonly used by cameras). Additionally, the inventive system also saves time because the camera does not need to be physically rotated nor does the image need to be processed for a digital rotation. With this inventive aspect of the present system, the system user can quickly produce a sequence of composite images with effective images that vary between portrait and landscape orientations, an example of which is shown in FIG. 6.

System Operation Flow

In configuring the output format, the person who is setting up the image composition in the GoodEye system may want to have banners, logos, counters, captions, or other overlays added to the photos that are to be produced. Generally, the setup person may be an event planner, a graphic artist, a photographer or a technician skilled in the GoodEye system. The setup person uses GoodEye system's software to generate a layout of the final picture composition. This results in an output image which contains an effective image. The effective image is the portion of the total layout represented by the cropped image taken by the system with the camera. The effective image may be the same size as the total media size and image or it may be some smaller portion. The setup person determines the dimensions of the effective image as described previously.

The GoodEye process starts the setup with the end product and then uses information from the end product to set parameters in the software. This allows for the effective image to reveal only the portion of the live image that will be visible in the final output image. It also allows for the automatic handling of aspect ratio, orientation, resolution, and image size, as described in detail above.

With the predefined cropping and automated image composition techniques of the present invention, the GoodEye system can be used to create high quality keepsake images in a fraction of the time that is currently required by current photography studios and even photo booths which may offer customers some limited personalizing of the pictures being produced. For example, the GoodEye system has been run at events where prints are being produced in excess of 200 prints per hour. For situations where there are groups of subjects, such as at a school function, business event or a fundraising event, the GoodEye system has been used for more than 100 group sessions per hour. It will be appreciated that individual photo sessions can be performed at an even faster rate since there is no need to arrange members of the group. Additionally, since the output images can be stored by the system immediately upon selection, it is possible to print during a photo session, at the end of a photo session, between back-to-back photo sessions, after a number of photo sessions or even after the end of an event. Additionally, the automation of the GoodEye system provides the user with a number of other features that have not been previously incorporated into or suggested for real-time imaging systems. Several of these features are shown in the drawings and described below following the description of the steps that a photographer can follow in creating a photograph using the GoodEye system.

Process for Photographer to Take & Output Pictures Using Inventive System

With the particular composite image and its effective image having already been predefined, the photographer can select between a portrait and landscape orientation for each effective image that is captured by the system for the particular composite image. The corresponding orientation is displayed on the live view so that the photographer can align, zoom and compose the subjects within the live view screen or viewfinder. The photographer selects the shutter release to capture the picture, i.e., the effective image. The system automatically displays the review image and creates the thumbnail image.

As soon as the effective image is captured, the photographer can take another picture and simultaneously select one or more pictures to print because, as described above, the system automatically populates the composite image with the effective image and no further cropping or any other post-processing is required. The photographer can also select the number of prints that can go to each printer, including changing the number of prints from the default selection. For example, the default number of pictures may be one, such as when the composition is based on pictures of couples, but many times there will be groups of couples or friends who each want their own print of the picture from an event, and in such a case, the photographer can enter a different number of prints for the group. The photographer or a helper or other system user-attendant then instructs the system to print the pictures, such as by selecting the print button icon that the software displays on the view screen. The system automatically adds the graphics and sends the picture to the printer. The system also creates an audit trail of the composite image along with a thumbnail image of the composite image and may take other automated actions, such as placing the composite image into a slide show or other presentation that is being displayed at the event. The system also increments the count of the various output images, i.e., the pictures that have been taken, printed, and/or e-mailed.

Slide Show Displays with Scripted Configurations & New Arrival Processing

Figure 10F:
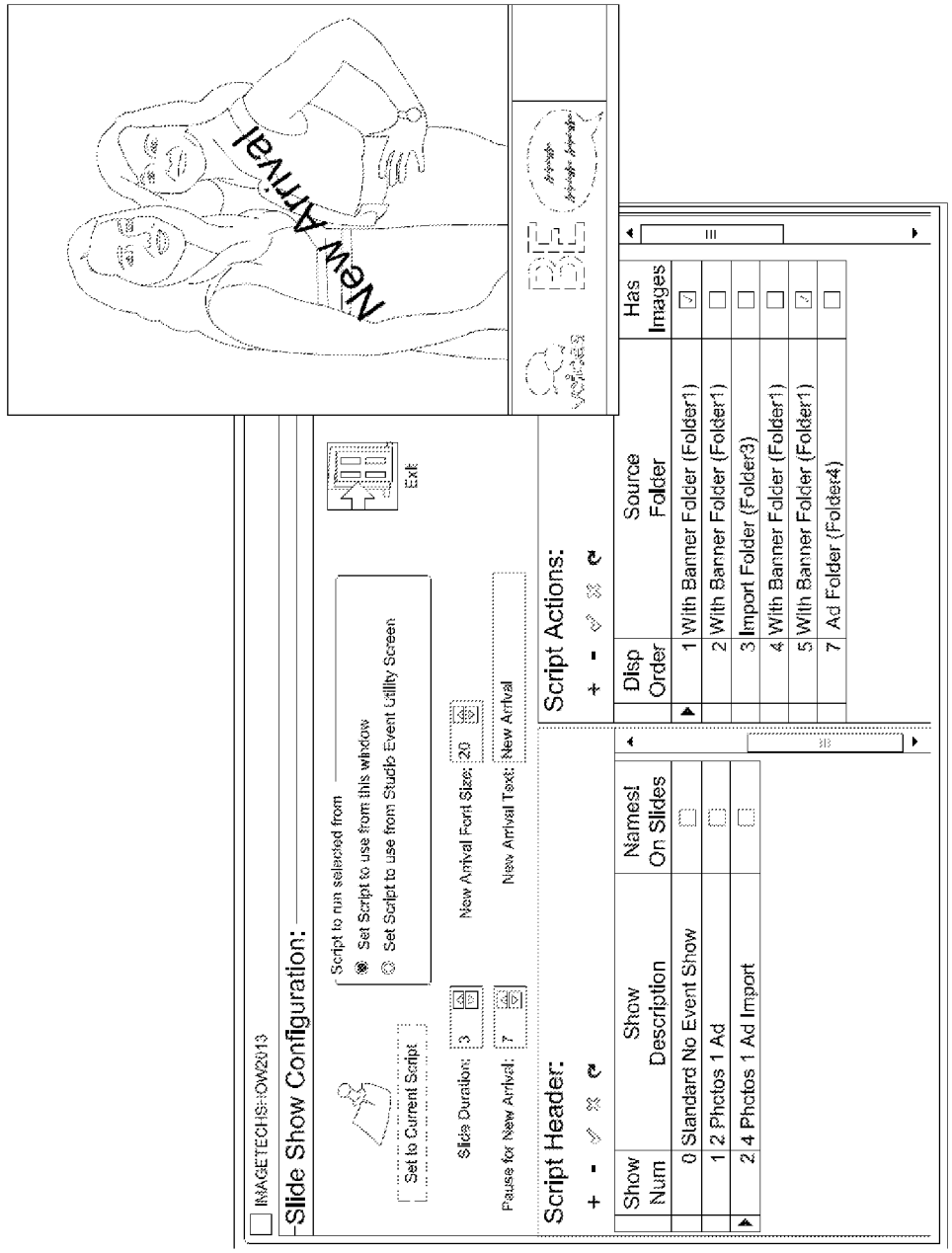

As generally described above, a number of scripts can be used to automatically process the pictures that are generated by the system. For example, as shown in FIGS. 1 and 10F, as a part of a slide show or other display/presentation configuration, the system can include an option to automatically identify the new arrivals to an event. A new arrival is identified as an attendee at the event who is the subject of a captured image and who has not yet been the subject of a previous captured image at the event. As explained in detail below, by connecting images and events with the subjects of the photographs, the system can help the photographer or other system user-attendant identify attendees who are new arrivals. Of course, the photographer could also just ask the subjects if this is their first picture at the event and identify the picture as one that the system should automatically process using the new arrival script. Another way of scripting this is whenever a picture is sent to the printer, it is considered a "new arrival" and the picture is also automatically sent to the front of the queue in the slide show. As soon as the output image is processed for a new arrival, the image can be automatically entered into the next screen of the slide show that shows the attendees. Accordingly, rather than placing the new arrival slide at the end of the slide show as is the custom for existing real-time event imaging systems, the inventive GoodEye system places the new arrival slide "next in line" in the slide show queue so that there is not a large delay between taking the picture of a new arrival and the display on the monitors at the event. The computer program that controls the slide show aspect of the system also includes an innovative pause feature that displays the new arrival image for a longer period of time than the typical duration for the slides showing the other attendees.

The slide show can also have different overlays for new arrivals, including different text banners that may be superimposed over the effective image in the output image. For example, although "New Arrival" is shown as the new arrival text, other text can be used, such as "Returning from Last Year" or "First Time Attendee" as the text. Different text may be particularly desirable when using a multi-camera system as discussed in detail below, with one camera at the entrance and another at the real-time imaging/output station. In such a multi-camera system, one of the cameras could identify newly arriving attendees who have been to an annual event in previous years, and the system could immediately insert into the ongoing slide show one of the attendee's images from the previous year's event. For attendees who have not been to a previous event, the system could allow the first camera to take an initial picture to serve as an announcement that they are a first time attendee. As also discussed below, the system preferably includes information linking the images to the attendees' contact information, and with such a link, the pictures that are displayed and printed can be personalized with the attendee information ("Welcome Back, [Attendee_Name]" or "Thank You for Attending, [Attendee_Name]").

Figure 5:
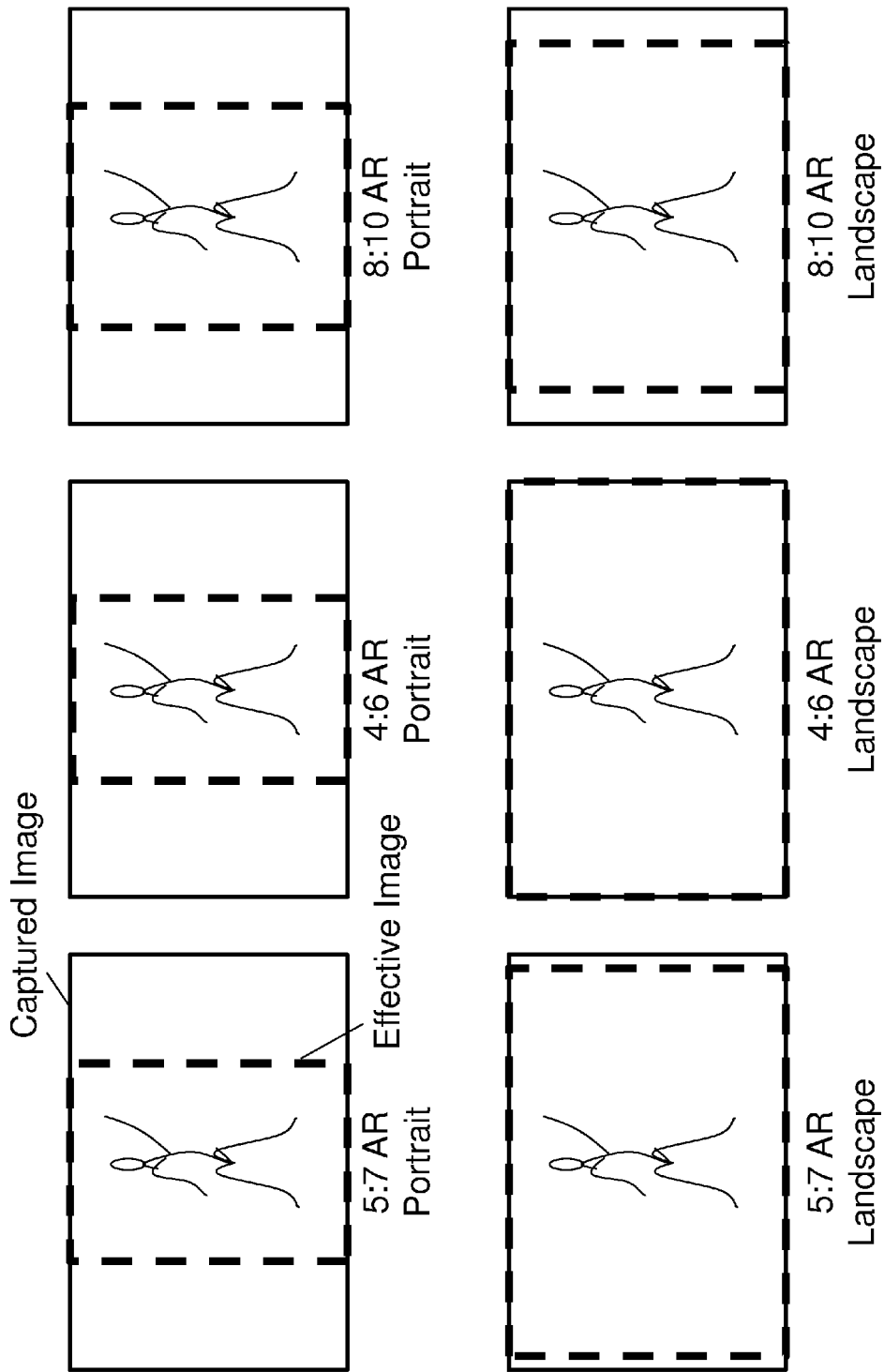
FIG. 5 shows various aspect ratios and orientations of the effective image relative to the source image.

The automated scripting for slide shows and other presentations begins with managing the orientation of the output images according to the display screens. For example, as shown in FIG. 1, when images are in a portrait view and the display screen is in a landscape view, it is possible to simultaneously display two portrait views on the display screen, and when an image matches the orientation of the display, such as the landscape view and image in FIG. 1, a single image can be displayed. Such a feature is generally known for real-time event photography with fixed camera and display orientations, such as at amusement parks where a series of pictures are taken of riders while on a ride and the pictures are then displayed in a booth where the riders exit the ride. However, these known systems do not allow for variations in the orientation of the pictures from one rider to the next. In comparison, as shown in FIGS. 5 & 6 and discussed in detail above, the present invention allows the photographer to switch between landscape and portrait orientations from one shot to the next. Therefore, it is an innovative aspect of the present invention to have a real-time imaging/output system in which the display can automatically vary between the landscape and portrait views and populate the display screen according to the selected orientation of the effective image and the corresponding orientation of the display. As indicated by Function F3 in FIG. 10G, the system can also automatically apply a stretch factor to the captured images to produce a slenderizing/skinny-effect which may be particularly useful when images are being displayed on a extremely large monitors at a stadium or on a wide-screen monitor.

Another innovation of the present system is the scripting of banners that are placed on the output images to be sent to the display screens or printers. The system user-attendant can select banner and overlay images from different source files and control the frequency of the placement of the banners. As with the sample image template discussed above, the source files preferably reside in default folders that are linked to the scripting tool (although the source files can be pulled from any file location that is available to the system). This feature allows the event organizer-host to rotate the display of its advertisers, sponsors and/or donors, and the double-banner and overlay system allows the organizer-host to also place its own banner on each one of the output images. For example, if there are five (5) sponsors that are being recognized at an event with their own banners, each one of the sponsors' banners can be sequentially populated onto five (5) output images. If one of the sponsors is being given special recognition, the scripting can repeat the specially recognized sponsor more often than the other sponsors, such as every third output image.

Additionally, when displaying the output images on screens, the system can allow the organizer-host to place one or more advertisement images within the sequence of output images. The host-organizer may also want to display images from previous events or from other sponsored or related activities. For example, for a company holiday party, pictures from an earlier company picnic may be displayed within the sequence of output images taken at the holiday party. Similarly, for a high school reunion, pictures from school days may be displayed within the sequence of output images taken at the reunion. Generally, any image can be imported into the system and displayed within the sequence of the output images.

In using the system for promotional events, the script can program banners to alternate between different sales representatives. In such a case, the individualized sales-rep banners serve as a business card for each of the respective sales representatives for the subject who are provided with one of the pictures. For example, at a car show or a grand opening where an automotive manufacturer or dealership is promoting one or more vehicles or a grand opening, the promoter may provide subjects with their picture in front of a concept car, or with a fashion model, a celebrity or another unique piece, such as a famous sports trophy, sports memorabilia, or another historical item.

Marketing & Promotional Literature

In addition to incorporating advertising images into slide show presentations, the system can be used to print on-demand literature at the event. Depending on the event, the literature may be sales brochures, charity sponsorships, or other promotional or informational pieces. The literature can be printed on the high quality photo printers from PDF files that can be formatted to print on 4"×6" or whatever size paper is in the printer. This allows the users to either print brochures as needed or print a batch in anticipation of a rush, such as at a trade show or other promotional event. The use of the system to print the literature when it is needed can be more economical, especially when large-scale printings are not required for an event and when smaller, more individualized printings are better suited to the particular situation.

Automatic Image Communications

Communications and storage of the image files is another use of the automatic functions that the system can control and perform using scripts. As discussed above, as a picture is being printed, the output image may also be automatically saved to the system's storage device. Additionally, a copy of the output image can also be copied or sent to other locations, such as storing the image file on a flash memory card or communicating the image file by ftp-transfer to web sites or other computers over a communications network.

Figure 10G:
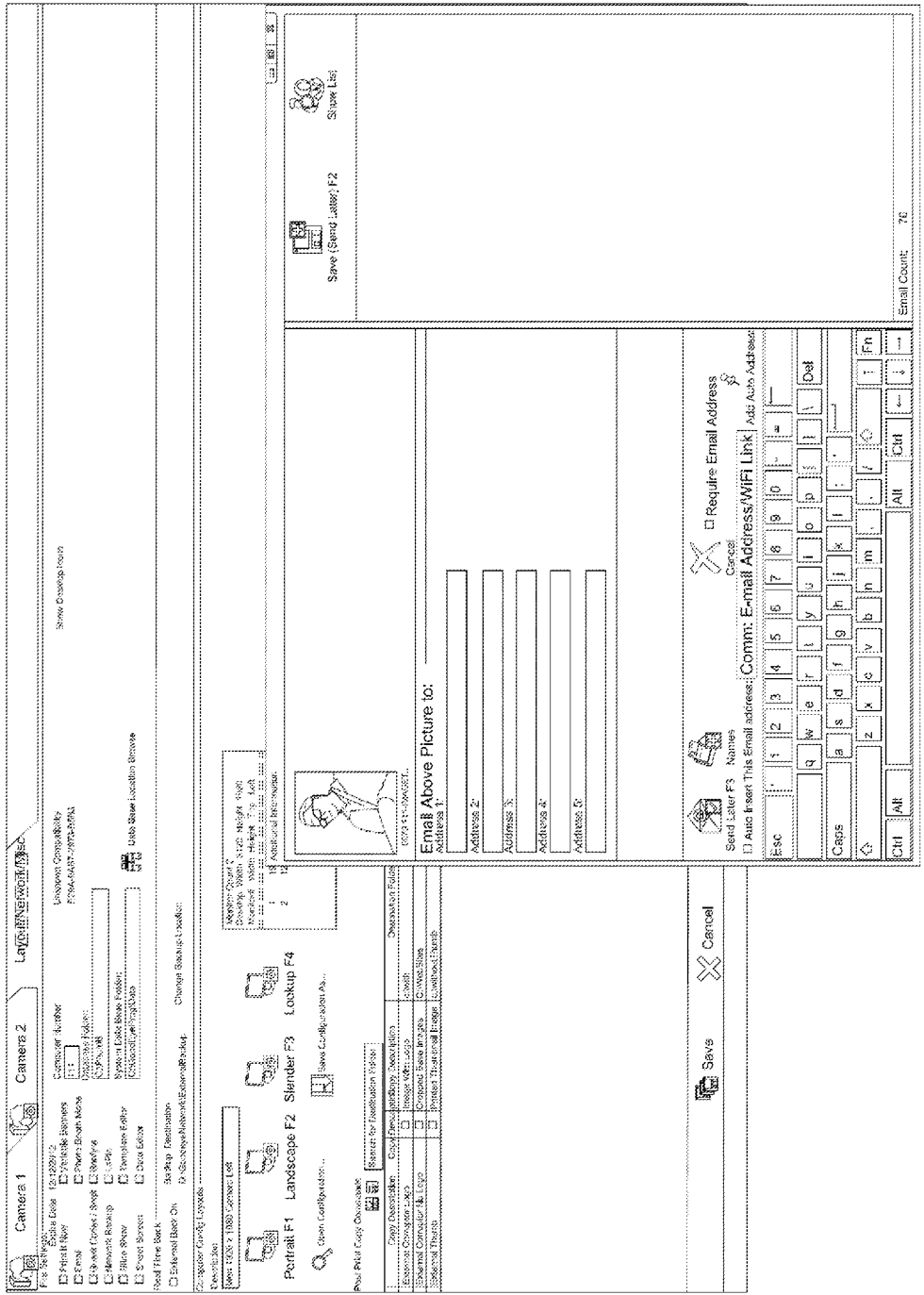

It is also possible to enter an e-mail address or create a secure network link (such as a wireless WiFi connection or a hardwired connection) or other preset com-link so that as each picture is printed, the electronic image file can be transmitted to another destination. The output image that is printed can be the composite image while the file for the effective image is transmitted. It is also possible to setup the system so that no picture is printed, and only the electronic image file is transmitted. The setup screen for these communications is shown in FIG. 10G, and an example of the composite image being printed and the effective image being transmitted is shown on FIGS. 1 and 4. In the particular example, when the image file is sent to a particular e-mail address for the stadium control room or is otherwise communicated to the control room through the stadium's secure com-link, the system immediately displays the image on the stadium's video monitors, including the central giant screen displays. The image is processed immediately prior to its transmission so that it meets the size, resolution, orientation and other requirements needed for optimum display on the giant screen displays.

In the particular example shown in FIG. 10G, multiple e-mail addresses can be entered for sending a picture file. In the default mode of operation, no e-mail address is required by the system. A "Require Email Address" check box may be selected to require that at least one email address is provided. Additionally, for uses such as described above with the stadium control room where there may be a sequence of several pictures that are displayed, the same e-mail address or secure com-link may be automatically used for multiple pictures with the printing of the picture by the system or some other trigger event being the condition that causes the system to communicate the image. The "Auto Insert this Email address" check box allows the user to repetitively send the pictures to a particular email address or secure com-link, and the "Add Auto Address" button allows the user to enter the e-mail address or com-link information. In addition to the control room example, such a feature may be desirable by the organizer/host or a sponsor of an event, or there may be multiple remote locations for a large event with multiple venues that are being updated in real time. Examples of such large events include many national and international awareness events, such as the "Partnership Walk", "Race for the Cure" and "Walk Now for Autism Speaks" events, or some sports events, such as the Olympics.

The "Send Later" button allows the e-mail to be held to be sent at a later time. Otherwise, an active access to the communication network required (via Ethernet, WiFi, or other means) and the system will automatically send the picture file as soon as it is ready following the trigger event, in real time. The "Cancel" button allows the system operator to leave the screen without arranging for any communication script being created; this clears all of the temporary data so if the operator comes back into this function without having created any script, the operator can begin fresh. The on screen keyboard allows for the use of a touch screen computer, such as a tablet computer (or even a smart-phone). Of course, an external (physical) keyboard can also be used for data entry.

It will be appreciated that the communications information may interface with a contacts database. The "Names" button can allow the system operator/user to search the contacts database by the name(s) of the recipients, and this can include distribution lists, list-serves and other forms of electronic communication techniques. Of course, for a new e-mail address or com-link, the system operator can add the corresponding name or other identifier to the listing, and this may be added to the contacts database or kept within the system. The "Show List" button can display the list of the contacts that are in an interfaced contacts database and/or stored in the system. The "Save (Send Later) F2" button allows a script to be created and saved in preparation for an event, i.e., before any pictures have been taken for the event.

When multiple sequential images are captured for one or more subjects, the subjects themselves can be shown the images to select one or more pictures that they want to have printed. The subject-selected print(s) is automatically stored separately as the output image. Although the system operator could select the image(s) to be printed, the subject-selection method helps prevent unwanted or unflattering photos being used in slide shows, exported after the event, placed in a publication, or posted on the web. Also, by automatically storing the subject-selected prints as the output image, the system operator doesn't have to decide which photo is kept for web uploads, collage creation, export and other post event uses of the photo.

Connecting Images & Events with Subjects

While the photo is being processed and printed, the subjects' e-mail addresses, names, notes and other information can be entered and stored for immediate or later use. When an internet connection is available, the photo can be immediately e-mailed, texted or otherwise provided through social media connections to the subjects in the picture. A message can be added to the e-mail body. Photo captions with text and hyperlinks as well as searchable "Keywords" can be embedded in the IPTC data of the image file. These captions and Keywords are displayed and indexed when the photo is viewed or searched on Facebook or other web sites. As indicated above, a resized and optimized copy of the photo is created for the purposes of e-mail attachments or web uploads. Accordingly, rather than e-mailing an attached photo in its full-scale form, which can be several megabytes or larger and which many e-mail accounts reject because of their limits on attachment sizes, the attachment can be reduced to a fraction of the full-scale size, such as reducing a 2-3 Mb image to a 200-300 Kb image.

Also, by archiving the photos and the corresponding subject and event data, the system can be used by the organizer and/or host of the event to do individualized follow up e-mails and other contacts with the subjects who are linked to the images. For example, a charity may send a "thank you" note to each one of the attendees who is a subject in one or more of the pictures or may send a "save the date" reminder when approaching the charity's annual event in the subsequent year or even when the charity may want to reach out for another event or may want to broaden its base through the use of the subjects' social networks. It will be appreciated that the printed photos may include a unique file name or number on the print which uniquely identifies the output image in the system so that there is a reverse linkage between printed output images and the effective images stored in the system which allows the attendees to order additional prints of the pictures.

Figures 11A, 11B:
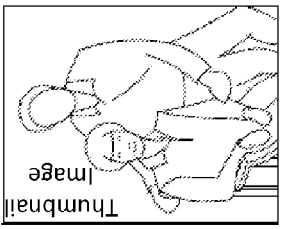

With the linkage between the unique file name or number and the subjects, the system can also be used to print a subject/ model release contract as shown in FIG. 11A. The release contract preferably identifies the effective image file along with the subject's names and includes the corresponding thumbnail image. The release contract could also include the event name and date. The terms of the release contract may allow the event organizer-host, sponsors and/or the photographer/system provider to use the defined image for promotions or whatever other purposes have been approved in the release, potentially including commercial purposes. The system could even be used to take a picture of the release contract after it is executed by the subjects and save the release contract image in a linked relationship to the image that has been released according to the release contract.

Additionally, the on-demand literature pieces discussed above can be personalized using the real-time imaging system and subject/event linkage of the present invention. For example, as shown in FIG. 11B, marketing pieces can formed from a composite image with a sales banner and which may have subject/event information populated in information fields, and another area can be used to populate an effective image showing the potential customer or a default image, such as a company logo, event-specific information or product information when printing the materials without including any particular subjects.

It will also be appreciated that some of the attendee information may be encrypted before it is embedded in the IPTC data so that it can only be accessed by using a key-code combination to unlock the encryption while other data is accessible without being encrypted. Encrypting more sensitive information, such as attendees' e-mail addresses and other sensitive contact information so it can be stored securely inside the photo file to be retrieved later, while keeping other less sensitive information in an open format can allow the images to be saved without having a separate external data table. Of course, it is also possible to save the full-size images with the IPTC data and incorporate the corresponding thumbnail images into the data tables of a database with the IPTC data as well as other information that may be of interest, and may include a link to the full-scale image file. In addition to sensitive contact information, other information that may either be encrypted in the IPTC data or saved in a secure database include notes on event related data, comments on subject interest and goals for future retrieval, and plans for periodic communication with attendees.

By keeping some IPTC data freely accessible without encryption for certain images, such as the unique file identifier printed on the output image and the subject names provided with the thumbnail images on a website, attendees at an event can quickly find any output images in which they are the subjects so that they may be able to order additional prints. It will be appreciated that a website can have a webpage for each event. It is possible to have passwords to enter the webpage corresponding with one set of events and keep the webpage for another set of events open without password protection.

The linking of the subjects with the photographs and event information provides many opportunities for follow ups when marketing and fundraising. The event organizer-sponsor has photographs that connect with the subjects on an emotional level and has the subject information for the photographs. By knowing who is in the photo and how to contact the subjects, the organizer-sponsor can use the photo as a marketing or fundraising tool. The photo with the embedded banner can be emailed, reprinted, framed, and placed on merchandise like coffee cups, note pads, mouse pads, pens, postcards, thank-you cards, greeting cards, calendars, clothing and other personalized items. Accordingly, the system includes post-event features that serve as a tool to build relationships between donors and customers and the respective sponsors and organizer-hosts of the events.

For family and other group events, the photographer/system provider can partner with the merchandise producers to provide the subjects in the stored images with an ordering platform that allows the subjects to select the merchandise and their corresponding images, confirm or change their contact information that the system has stored with the subjects' respective images and pay for the merchandise. Family and group events can be weddings, birthdays, reunions, anniversaries, graduations, baptisms, bat mitzvahs, bar mitzvahs, showers, and other events. It is also possible for group events or even corporate events to provide the subjects with merchandise options.

When an attendee of an event is the subject of several pictures, the innovative "New Arrival" feature of the present invention could also be used as the default identification of the picture to use when communicating with the attendee, i.e., the default communication image. This identification avoids the problem of sending multiple messages to the same attendee who is the subject of several different pictures. Of course, for such an attendee, the system can permit the photographer or the event organizer-host to change the default communication image linked to the attendee.

It will also be appreciated that by archiving attendee information in the system, it is possible to quickly retrieve returning attendees and confirm the attendees' respective contact information or change the contact information in real-time at an event. Of course, the system can interface with the event organizer-host's database of contacts to update the attendee information before the event. Similarly, following the event, any changes to the attendee information or new attendee information that is different from or not in the event organizer-host's database can be evaluated to determine whether updates should be made to the organizer-host's database. This feature and the comparison of database information could be very helpful to the organizers and hosts of charity, organization/corporate or even social/family events who want to keep in contact with their supporters, friends and colleagues.

Figure 12:
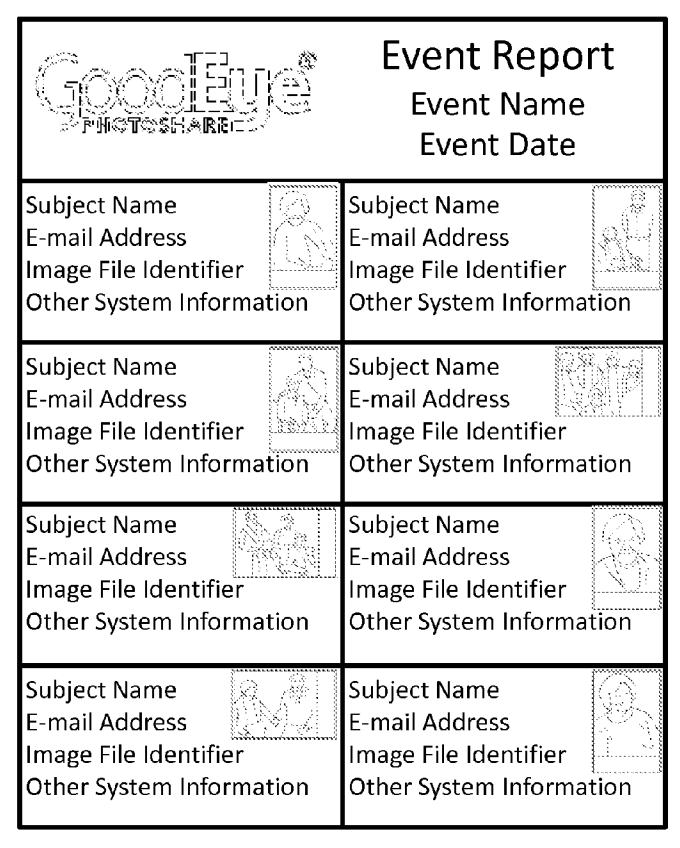

As shown in FIG. 12, the system can also use the event and subject information to create reports with the corresponding thumbnail images. Other reports can be generated with information stored by the system, such as the number of pictures taken and printed, unique e-mails collected, advertising slides printed or displayed, etc.

By incorporating facial recognition technology into the system, it would even be possible to retrieve returning attendee information automatically when one or more subjects enter into the field of view of the source image. While the photographer is arranging the shot, the system would preferably first search for subject matches in previous events for the particular organizer-host. If no match is found and the photographer takes the shot, while the prints are being produced and/or the photographer or the helper is entering the attendee information, the system could also search for a subject match in other events that were hosted or otherwise organized by another entity. The matching of subjects across different organizer-host events would not necessarily be shared with the various organizer-host entities and may be helpful in identifying individuals who may be more familiar with the benefits of the inventive real-time image processing and output system and would be receptive to marketing materials explaining how they may want to use the system at their next group function or event.

The facial recognition feature and database aspect of the present invention could even be used for automatic announcements of attendees to an event even before these new arrivals make their way to the formal real-time imaging/output station. The system can have a remote camera stationed at the entrance to the event, such as Camera 2 in FIG. 10G that may be located by a welcoming table or the front entrance. The remote camera is preferably linked to the same system that is being used to take the event photography although it may be operated in combination with a separate computer so that it is an independent version of the inventive system apart from the real-time imaging/output station. As new attendees arrive, the system can retrieve their information and post it on the screen with the thumbnail image from the last event and a preview image of the newly arriving attendee that was used to make the match so that the event's welcoming committee can have a list of people as they enter, welcome them and quickly confirm their attendance within the system. This will save time for the welcoming committee to help attendees who may not have attended previous events that they have hosted.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the present invention can be used for any group event or corporate events that may be an annual or periodic gathering, such as rallies (Sturgis motorcycle rally), shows (Oshkosh air show), fan conventions (Star Wars), jamborees (Boy Scouts), fairs and expositions (World Fair), sports games (World Series), shareholders' meetings (Berkshire Hathaway). It will also be appreciated that the present invention can be used at amusement and theme parks and may be incorporated into photo booth systems and photography studios. Thus, the breadth and scope of the present invention should not be limited by any of the above-described exemplary embodiments, but should be defined only in accordance with the following claims appended hereto and their equivalents.

What is claimed is:

1. A method for processing a source image produced by a digital camera, wherein the source image has a camera-defined aspect ratio and the digital camera is arranged with a camera-defined orientation, comprising the steps of:

defining a composite image area corresponding with an output image format;

selecting an effective image area no larger than said composite image area, wherein said effective image area has a user-selected aspect ratio and a user-selected orientation;

calculating in a computer processor an effective image portion of the source image in which said user-selected aspect ratio and said user-selected orientation fit within the camera-defined aspect ratio and the camera-defined orientation of the source image;

receiving the source image in said computer processor from the digital camera through an operative communication with said computer processor;

formatting a view screen in communication with said computer processor to show a live view produced by the digital camera within said effective image portion of the source image according to said user-selected aspect ratio and said user-selected orientation;

arranging said composite image area with said effective image area and at least one additional area comprising at least one of a logo, a banner and an overlay;

showing a stream of live images on said view screen within said effective image portion of a plurality of the source images;

selecting an image from said stream of live images using at least one of the digital camera and said computer processor;

capturing said selected image in a memory of said computer processor;

automatically cropping said captured image in said memory of said computer processor to match said effective image area;

automatically populating said composite image area with said cropped image in said effective image area using said computer processor; and printing said populated composite image while allowing a subsequent picture to be captured.

2. The invention of claim 1, wherein said output image format has a size with an aspect ratio corresponding with a printer.

3. The invention of claim 1, wherein said output image format has a size with an aspect ratio corresponding with at least one of a printer, a display screen, and a web browser application.

4. The invention of claim 1, wherein said calculating step is further comprised of calculating a maximum size of said effective image portion fitting within the source image.

5. The invention of claim 1, wherein said calculating step is further comprised of determining a center of said effective image portion within the source image.

6. The invention of claim 1, further comprising the steps of:
formatting said composite image area in a first arrangement with said effective image area in a portrait orientation arrangement and in a second arrangement with said effective image area a landscape orientation arrangement;

selecting between said first arrangement and said second arrangement for said composite image area, wherein said selection is performed in said computer processor without physically rotating the digital camera;

automatically adjusting said calculating step of said effective image portion of the source image in said memory of said computer processor to said portrait orientation arrangement when said first arrangement is selected and to said landscape orientation arrangement when said second arrangement is selected, wherein said adjusting of said calculating step is performed without any digital rotation of the source image;

wherein said cropping step is performed without any digital rotation of said effective image portion; and wherein said populating step is performed without any digital rotation of said cropped image.

7. The invention of claim 1, further comprising the steps of:
capturing the source image in a memory of said computer processor;

communicating said populated composite image to a printer;

automatically communicating said populated composite image to a monitor;

displaying said populated composite image on said monitor; and storing in a computer memory device a full-size file and at least one reduced-size file, wherein said full-sized file and said reduced-size file comprise at least one of said cropped image and said populated composite image.

8. The invention of claim 7, further comprising the steps of:
placing said populated composite image as a new image in a slide show comprised of a plurality of populated composite images; and displaying said slide show on a plurality of monitors.

9. The invention of claim 8, wherein said slide show comprises a first time period for displaying said plurality of populated composite images and a second time period for displaying said new image, wherein said second time period is longer than said first time period.

10. The invention of claim 9, wherein a temporary overlay is placed on said new image while being displayed during said second time period and wherein said temporary overlay is not included in said step of printing said populated composite image.

11. The invention of claim 8, further comprising the steps of:
selecting said banner from a plurality of banner source files;

arranging said composite image area with said effective image area and at least one additional area comprising said banner, wherein said plurality of populated composite images in said slide show are further comprised of a plurality of banners from said banner source files;

rotating said banners used in printing said composite images; and rotating said banners used in said populated composite images during said slide show.

12. The invention of claim 7, further comprising the steps of:
placing said populated composite image as a new image in a slide show comprised of a plurality of populated composite images;

incorporating advertisement images into said slide show; and displaying said slide show on a plurality of monitors.

13. The invention of claim 1, further comprising the steps of:
storing said effective image portion in a computer memory; and printing said effective image portion in a photo release.

14. The invention of claim 1, further comprising the steps of:
providing a green screen, wherein said captured image comprises said green screen and a subject image in front of said green screen;

storing at least one background image in said memory of said computer processor;

wirelessly transmitting said captured image from the digital camera to said computer processor; and automatically replacing said green screen portion of said captured image with said background image in said computer processor.

15. The invention of claim 14, further comprising the steps of:
selecting said one background image from a plurality of optional background images; and wirelessly transmitting at least one of said captured image and said populated composite image from said computer processor to the digital camera.

16. A method for processing a source image produced by a digital camera, wherein the source image has a source image format with a camera-defined aspect ratio and the digital camera is arranged with a camera-defined orientation, comprising the steps of storing a plurality of optional print formats in a computer memory, wherein said optional print formats correspond to a plurality of respective print sizes;

selecting an output print format in a computer processor from said optional print formats, wherein said output print format has a first aspect ratio;

defining a composite image format in said computer processor corresponding with said selected print format, wherein said composite image format comprises an effective image area and at least one of a banner area and an overlay area, wherein said effective image area has a second aspect ratio and an arrangement as a portrait orientation or a landscape orientation and wherein second aspect ratio can be different from said first aspect ratio and the camera-defined aspect ratio;

formatting said composite image area in a first arrangement with said effective image area in a portrait orientation and in a second arrangement with said effective image area a landscape orientation;

transferring live view images from the digital camera to said computer processor in the camera-defined aspect ratio of the source image format and the camera-defined orientation;

determining in said computer processor a maximum area of the source image in which said effective image area fits according to said second aspect ratio and said orientation arrangement;

displaying said live scene images on a display screen of said computer according to said second aspect ratio and said orientation arrangement of said effective image area;

capturing an image by said camera;

automatically transferring said captured image from said camera to said computer processor upon completion of said capture step;

automatically cropping said captured image in said computer processor according to said effective image area;

automatically populating said effective image area in said composite image format to form a completed picture image; and printing said completed picture image.

17. The invention of claim 16, further comprising the step of centering said effective image area within the source image.

18. The invention of claim 16, further comprising the steps of:

storing said completed picture image in said computer memory;

placing said completed picture image as a new image in a slide show comprised of a plurality of completed picture images; and displaying said slide show on a monitor, wherein said slide show comprises a first time period for displaying said plurality of completed picture image and a second time period for displaying said new image, wherein said second time period is longer than said first time period, wherein a temporary overlay is placed on said new image while being displayed during said second time period and wherein said temporary overlay is not included in said step of printing said completed picture image.

19. The invention of claim 16, further comprising the steps of:

providing a green screen, wherein said captured image comprises said green screen and a subject image in front of said green screen;

storing at least one background image in said computer memory;

wirelessly transmitting said captured image from the digital camera to said computer processor; and automatically replacing said green screen portion of said captured image with said background image in said computer processor.

20. The invention of claim 19, further comprising the steps of:

selecting said one background image from a plurality of optional background images; and wirelessly transmitting at least one of said captured image and said completed picture image from said computer processor to the digital camera.

* * * * *